(12) United States Patent
Fukumoto

(10) Patent No.: US 12,549,834 B2
(45) Date of Patent: Feb. 10, 2026

(54) VEHICLE CONTROL DEVICE, VEHICLE CONTROL METHOD, AND COMPUTER PROGRAM PRODUCT

(71) Applicant: DENSO CORPORATION, Kariya (JP)

(72) Inventor: Harutsugu Fukumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 18/179,958

(22) Filed: Mar. 7, 2023

(65) Prior Publication Data

US 2023/0219532 A1 Jul. 13, 2023

Related U.S. Application Data

(63) Continuation of application No. PCT/JP2021/030490, filed on Aug. 20, 2021.

(30) Foreign Application Priority Data

Sep. 11, 2020 (JP) ................................. 2020-153238
Jul. 29, 2021 (JP) ................................. 2021-124655

(51) Int. Cl.
*H04N 23/45* (2023.01)
*B60S 1/46* (2006.01)
(Continued)

(52) U.S. Cl.
CPC .............. *H04N 23/45* (2023.01); *G01S 17/86* (2020.01); *G01S 17/931* (2020.01);
(Continued)

(58) Field of Classification Search
CPC ........ H04N 23/45; H04N 23/52; G01S 17/86; G01S 17/931; G01S 2007/4977;
(Continued)

(56) References Cited

U.S. PATENT DOCUMENTS

2004/0257556 A1 12/2004 Samukawa et al.
2016/0131579 A1* 5/2016 Sekiguchi .............. G01N 21/94
250/201.1

(Continued)

FOREIGN PATENT DOCUMENTS

JP 2013-120076 A 6/2013
JP 2014-041106 A 3/2014
(Continued)

OTHER PUBLICATIONS

Machine Translation: WO-2014042168-A1 (Year: 2014).*
Machine Translation: JP-2019008431-A (Year: 2019).*
U.S. Appl. No. 18/179,972 and its entire file history (Our Ref: D2203.11172US01) filed 2023-03-07, Harutsugu Fukumoto.

*Primary Examiner* — Anne Marie Antonucci
*Assistant Examiner* — Connor L Knight
(74) *Attorney, Agent, or Firm* — Maschoff Brennan

(57) ABSTRACT

A vehicle control device is configured to control a vehicle equipped with (i) an optical sensor configured to acquire a reflected light image by sensing reflected light of irradiated light and (ii) a sensing camera configured to acquire a camera image according to intensity of outside light in a sensing area which overlaps with a sensing area of the optical sensor. The vehicle control device includes an extraction unit configured to extract an unmatched pixel group by comparing the reflected light image with the camera image, and a control unit configured to instruct the vehicle to control according to a water-related substance estimated to correspond to the unmatched pixel group.

14 Claims, 21 Drawing Sheets

(51) Int. Cl.
    *B60S 1/54*       (2006.01)
    *B60S 1/56*       (2006.01)
    *G01S 17/86*      (2020.01)
    *G01S 17/931*     (2020.01)
    *G06V 10/44*      (2022.01)
    *G06V 20/58*      (2022.01)
    *H04N 23/52*      (2023.01)
    *G01S 7/497*      (2006.01)

(52) U.S. Cl.
    CPC ............. *G06V 10/443* (2022.01); *G06V 20/58* (2022.01); *H04N 23/52* (2023.01); *G01S 2007/4977* (2013.01)

(58) Field of Classification Search
    CPC ............. G01S 2007/4975; G01S 17/42; G01S 13/867; G06V 10/443; G06V 20/58; G06V 10/74; G06V 10/751; B60S 1/56
See application file for complete search history.

(56) References Cited

U.S. PATENT DOCUMENTS

| | | | |
|---|---|---|---|
| 2017/0064221 A1* | 3/2017 | Taylor | H04N 25/131 |
| 2019/0385025 A1* | 12/2019 | McMichael | G06V 10/82 |
| 2020/0142042 A1 | 5/2020 | Hibino et al. | |
| 2020/0159010 A1* | 5/2020 | Kuwae | B08B 5/02 |
| 2020/0226403 A1* | 7/2020 | Evans | G01S 7/497 |
| 2020/0398797 A1* | 12/2020 | Herman | H04N 23/811 |
| 2021/0122294 A1* | 4/2021 | Mandai | H04N 23/811 |
| 2022/0402463 A1* | 12/2022 | Fiebrandt | B60S 1/54 |
| 2023/0311818 A1* | 10/2023 | Uchiyama | B60Q 1/143 239/284.2 |

FOREIGN PATENT DOCUMENTS

| | | | | |
|---|---|---|---|---|
| JP | 2017-138761 A | | 8/2017 | |
| JP | 2019008431 A | * | 1/2019 | |
| WO | WO-2014042168 A1 | * | 3/2014 | ............. G01S 17/89 |

* cited by examiner

VEHICLE CONTROL DEVICE, VEHICLE CONTROL METHOD, AND COMPUTER PROGRAM PRODUCT

CROSS REFERENCE TO RELATED APPLICATION

The present application is a continuation application of International Patent Application No. PCT/JP2021/030490 filed on Aug. 20, 2021, which designated the U.S. and claims the benefit of priority from Japanese Patent Applications No. 2020-153238 filed on Sep. 11, 2020, and Japanese Patent Application No. 2021-124655 filed on Jul. 29, 2021. The entire disclosures of all of the above applications are incorporated herein by reference.

TECHNICAL FIELD

The present disclosure relates to a technology for controlling a sensor system in vehicles.

BACKGROUND

Water-related substance such as rain, fog, and water vapor in the sensing area of the sensor system of the vehicle causes deterioration in sensing accuracy. Accordingly, determination of the presence of water-related substance affects vehicle control. Especially in recent years, the presence of water-related substance in the automated driving mode of the vehicle has become an important control factor because it determines the continuity of automated driving.

SUMMARY

A first aspect of the present disclosure is a vehicle control device configured to control a vehicle equipped with (i) an optical sensor configured to acquire a reflected light image by sensing reflected light of irradiated light and (ii) a sensing camera configured to acquire a camera image according to intensity of outside light in a sensing area which overlaps with a sensing area of the optical sensor. The vehicle control device includes: an extraction unit configured to extract an unmatched pixel group by comparing the reflected light image with the camera image; and a control unit configured to instruct the vehicle to control according to a water-related substance estimated to correspond to the unmatched pixel group.

A second aspect of the present disclosure is a vehicle control method for controlling a vehicle equipped with (i) an optical sensor configured to acquire a reflected light image by sensing reflected light of irradiated light and (ii) a sensing camera configured to acquire a camera image according to intensity of outside light in a sensing area which overlaps with a sensing area of the optical sensor. The vehicle control method includes: extracting an unmatched pixel group by comparing the reflected light image with the camera image; and instructing the vehicle to control according to a water-related substance estimated to correspond to the unmatched pixel group.

A third aspect of the present disclosure is a computer program product configured to control a vehicle equipped with (i) an optical sensor configured to acquire a reflected light image by sensing reflected light of irradiated light and (ii) a sensing camera configured to acquire a camera image according to intensity of outside light in a sensing area which overlaps with a sensing area of the optical sensor, the computer program product being stored on at least one non-transitory computer readable medium and comprising instructions. The instructions are configured to, when executed by at least one processor, cause the at least one processor to: extract an unmatched pixel group by comparing the reflected light image with the camera image; and instruct the vehicle to control according to a water-related substance estimated to correspond to the unmatched pixel group.

EMBODIMENTS

Comparative Example

A technique of a comparative example is for determining dirt such as water droplets adhering to an incident surface of a sensor system on which light is incident from a sensing area. In this comparative example, the dirt on the incident surface is determined based on changes in intensity of the reflected light of the light irradiation.

However, in the comparative example, the presence of the water-related substance cannot be determined unless the water-related substance adheres to the incident surface. It may be difficult to avoid a situation where the deterioration in sensing accuracy of the sensor system causes deterioration in the appropriateness of the vehicle after the water-related substance adheres to the incident surface.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

Figure 1:
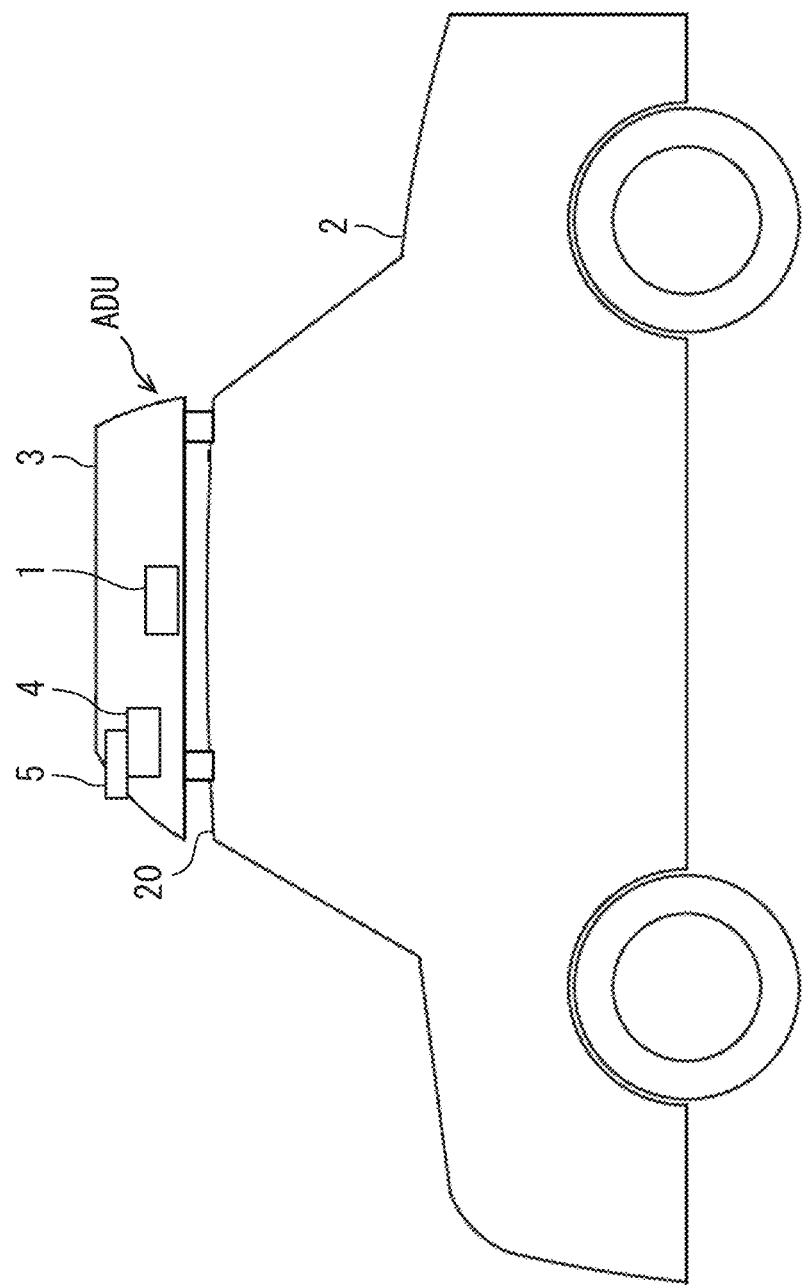
FIG. 1 is a side view of an automated driving unit mounted in a vehicle according to a first embodiment.
Figure 2:
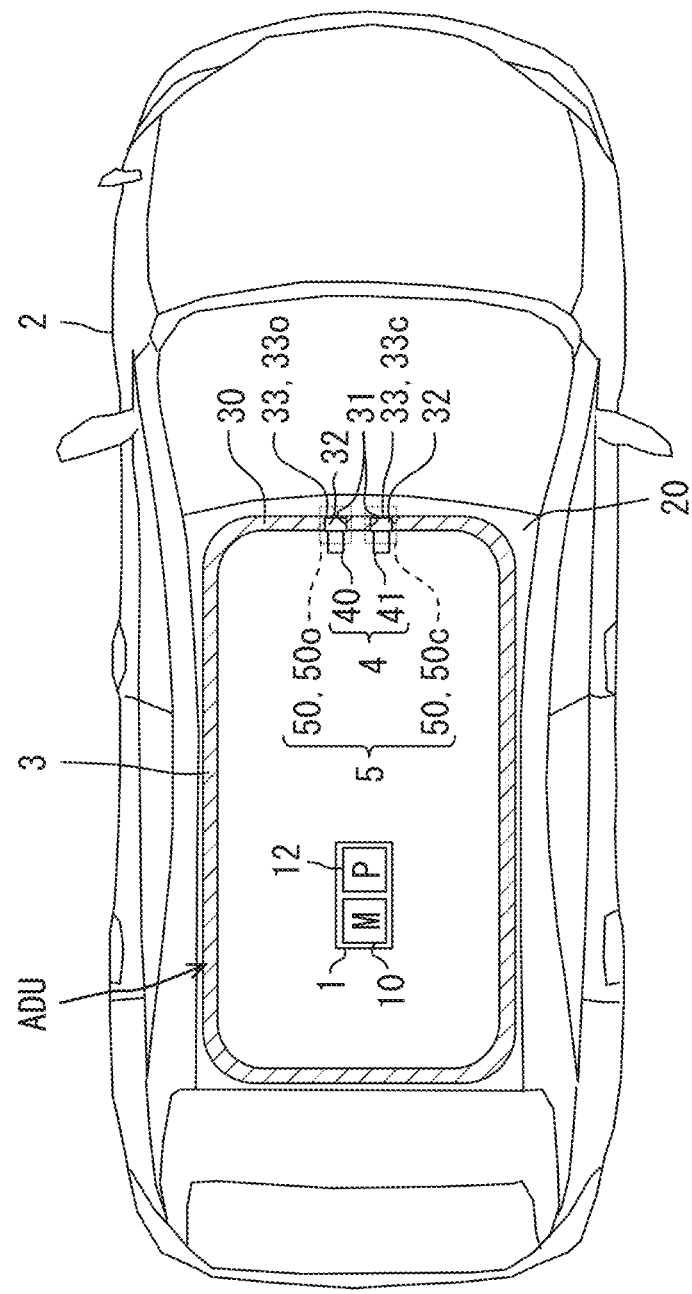
FIG. 2 is a cross-sectional diagram illustrating the automated driving unit according to the first embodiment.
Figure 3:
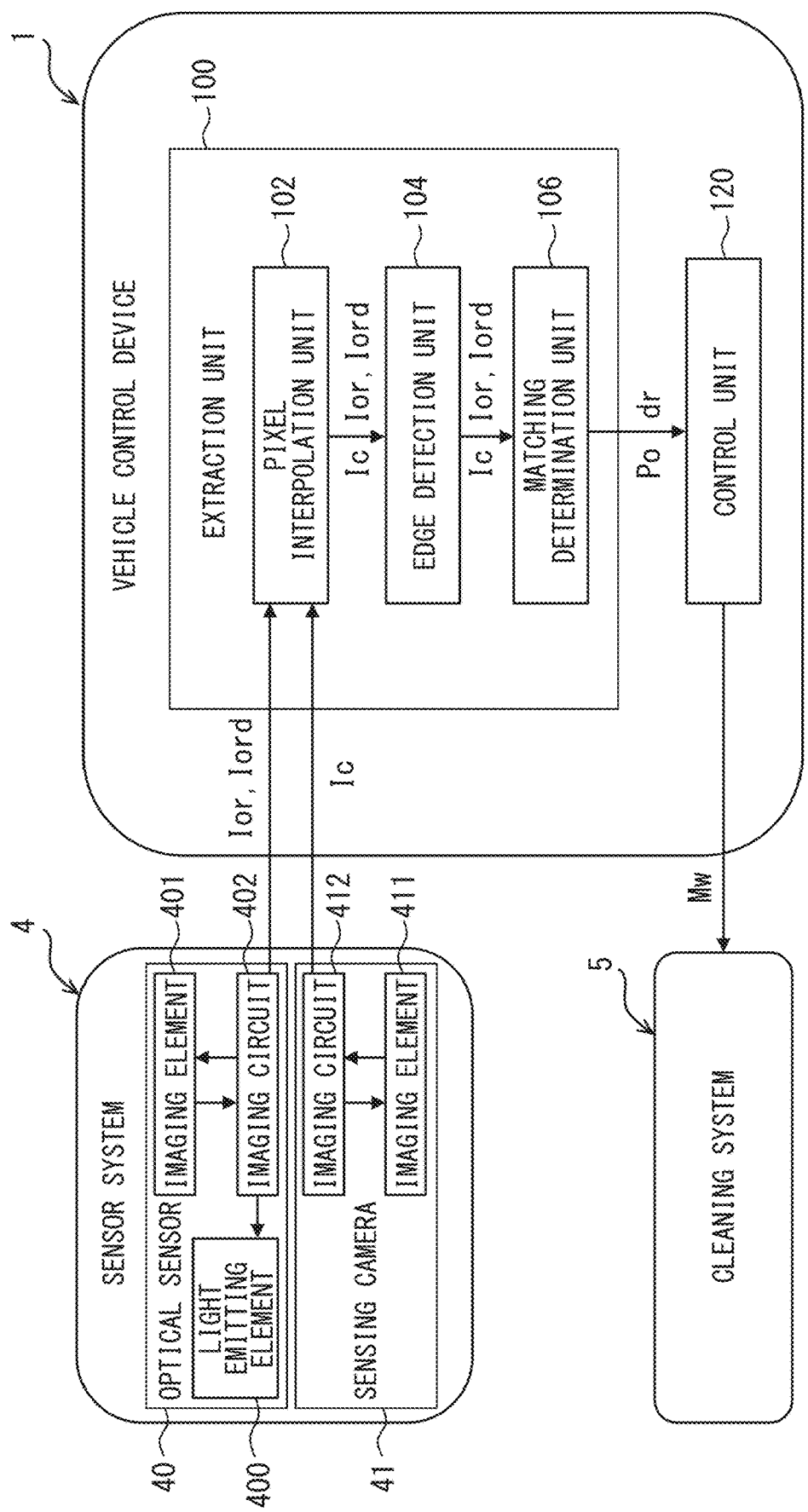
FIG. 3 is a block diagram showing the function configuration of a vehicle control device according to the first embodiment.

As shown in FIG. 1, an automated driving unit ADU provided with a vehicle control device 1 of a first embodiment is mounted in a vehicle 2. The vehicle 2 is capable of steady or temporary automated driving in an automated driving mode under automated driving control or advanced driving support control. As shown in FIGS. 1 to 3, the automated driving unit ADU includes a vehicle control device 1, a housing 3, a sensor system 4, and a cleaning system 5. In the following description, front, rear, left, right, top and bottom are defined with respect to the vehicle 2 on the horizontal plane.

As shown in FIGS. 1, 2, the housing 3 is made of metal and has a hollow flat box shape, for example. The housing 3 is installed on a roof 20 of the vehicle 2. Multiple sensor windows 31 are open on a wall 30 of the housing 3. Each sensor window is covered by a translucent cover 32 having a plate shape. An outer surface of each translucent cover 32 is an incident surface 33 on which light from the outside of the vehicle 2 is incident.

Figure 4:
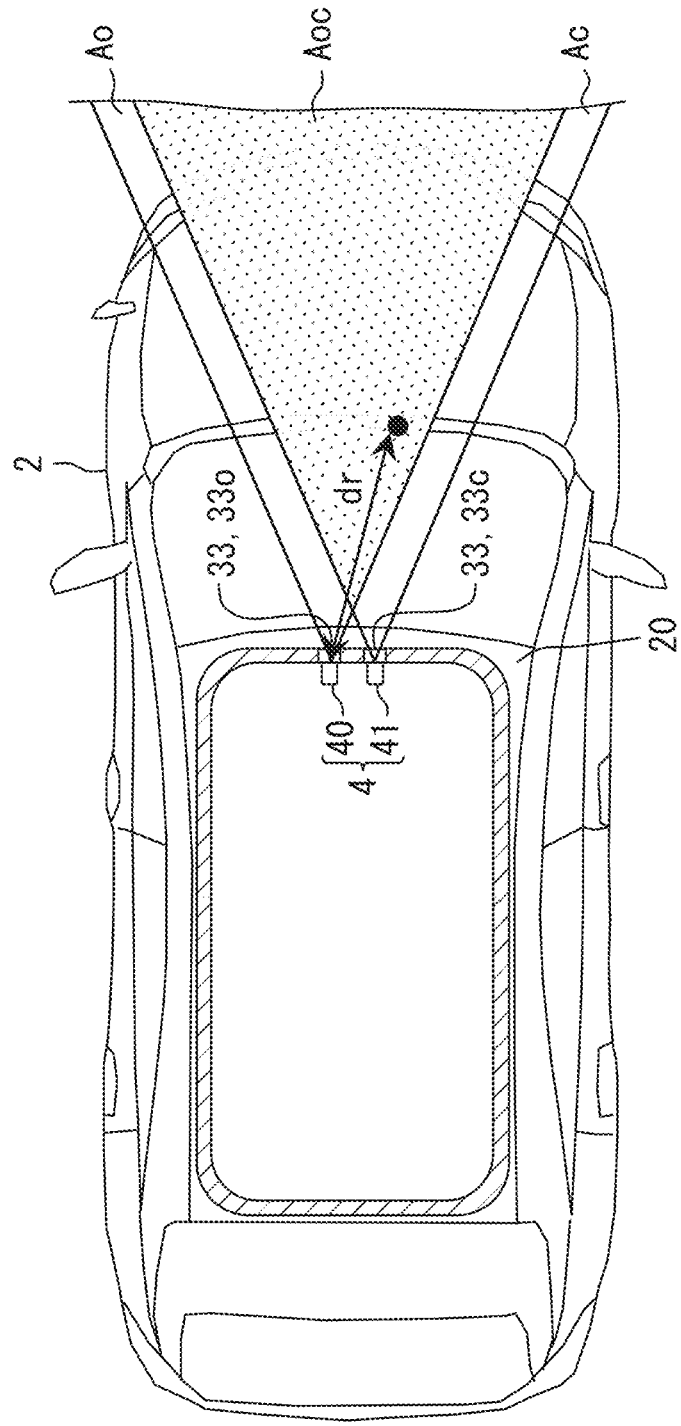
FIG. 4 is a cross-sectional diagram illustrating a sensing range of an optical sensor and a sensing camera according to the first embodiment.

As shown in FIGS. 2-4, the sensor system 4 includes an optical sensor 40. The optical sensor 40 of the first embodiment is a so-called LiDAR (Light Detection and Ranging/Laser Imaging Detection and Ranging) configured to acquire optical information that can be used in the automated driving mode of the vehicle 2. The optical sensor 40 includes a light emitting element 400, an imaging element 401, and an imaging circuit 402.

The light emitting element 400 is, for example, a semiconductor element such as a laser diode configured to emit directivity laser light. The light emitting element 400 is configured to intermittently irradiate laser light toward the outside of the vehicle 2 in the form of a pulse beam. The imaging element 401 is a semiconductor element such as SPAD (Single Photon Avalanche Diode) highly sensitive to light. An incident surface 33o for the optical sensor 40 is located on an outside (front side in the present embodiment) of the imaging element 401. The imaging element 401 is exposed to light incident on the incident surface 33o from a sensing area Ao defined by a view angle of the imaging element 401 in the outside. The imaging circuit 402 is an integrated circuit configured to control exposure and scan of pixels of the imaging element 401, and process signals from the imaging element 401 into data.

In a reflection light mode in which the imaging circuit 402 exposes the imaging element 401 to light emitted from the light emitting element 400, an object in the sensing area Ao is a reflection point of the laser light. As a result, the laser light reflected at the reflected point (hereinafter, referred to as reflected light) is incident on the imaging element 401 through the incident surface 33o. At this time, the imaging circuit 402 scans multiple pixels of the imaging element 401 to sense the reflected light. The imaging circuit 402 converts the distance value acquired for each pixel based on a reflection point distance dr of the reflected light sensed as shown in FIG. 4 into three-dimensional data as each pixel value to acquire a distance image Iord which is the reflected light image Ior shown in FIG. 5.

As shown in FIGS. 2-4, the sensor system 4 includes a sensing camera 41 in addition to the optical sensor 40. The sensing camera 41 is an external camera configured to acquire optical information used for the automated driving mode of the vehicle 2. The sensing camera 41 includes an imaging element 441 and an imaging circuit 402.

The imaging element 411 is a semiconductor element such as CMOS. An incident surface 33c for the sensing camera 41 is located on an outside (front side in the present embodiment) of the imaging element 411. The imaging element 411 is exposed to light incident on the incident surface 33c from a sensing area Ac defined by a view angle of the imaging element 411 in the outside. As shown in FIG. 4, the sensing area Ac of the sensing camera 41 partially overlaps with the sensing area Ao of the optical sensor 40. The overlapping rate of the sensing areas Ac, Ao, that is, the ratio of the overlapping area Aoc in the sensing areas Ac, Ao is, for example, 50% or more, preferably 70% or more, and further preferably 90% or more. The imaging circuit 412 is an integrated circuit configured to control exposure and scan of pixels of the imaging element 411, and process signals from the imaging element 411 into data.

Figure 6:
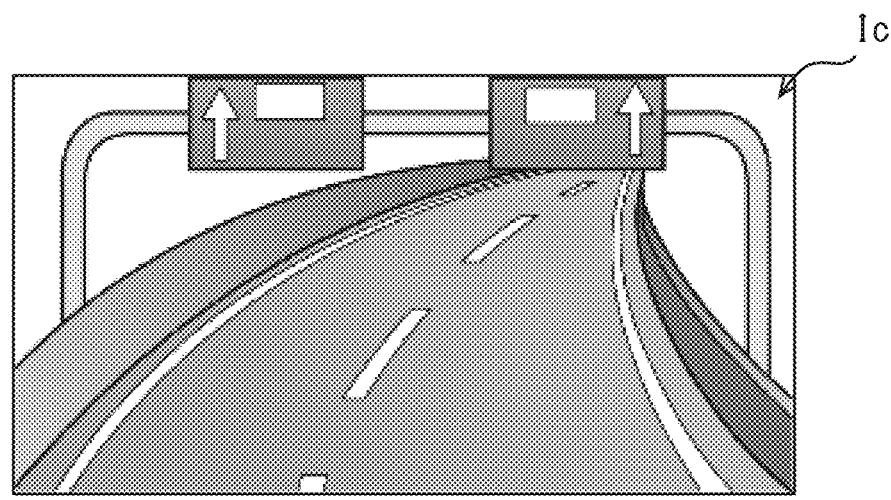
FIG. 6 is a diagram illustrating an image acquired by the sensing camera according to the first embodiment.

In an exposure mode in which the imaging circuit 412 exposes the imaging element 411 to light, an object in the sensing area Ac is a reflection point of outside light. As a result, the outside light reflected at the reflection point is incident on the imaging element 411 through the incident surface 33c. At this time, the imaging circuit 412 scans multiple pixels of the imaging element 411 to sense the reflected outside light. The imaging circuit 412 converts luminance value acquired for each pixel based on intensity of the sensed outside light into two-dimensional data as pixel value to acquire a camera image Io shown in FIG. 6.

The cleaning system 5 shown in FIGS. 1-3 is configured to clean the incident surfaces 33 including the incident surfaces 33o, 33c of the optical sensor 40 and the sensing camera 41 on which light is incident from the sensing areas Ao, Ac. The cleaning system 5 includes a cleaning module 50 for each incident surface 33. Each cleaning module 50 may include a cleaning nozzle configured to inject cleaning gas such as air as a cleaning fluid for cleaning the incident surface 33. Each cleaning module 50 may include a cleaning nozzle configured to inject cleaning liquid as a cleaning fluid for cleaning the incident surface 33. Each cleaning module 50 may have a cleaning wiper configured to clean the incident surface 33 by wiping.

The driving control device 1 shown in FIGS. 2, 3 is connected with the electrical elements 4, 5 of the automated driving unit ADU through at least one of LAN (Local Area Network), a wire harness, an internal bus, and the like. The vehicle control device 1 includes at least one dedicated computer. The dedicated computer of the vehicle control device 1 may be an operation control ECU that controls the automated driving control mode in cooperation with an ECU (Electronic Control Unit) in the vehicle 2. The dedicated computer that constitutes the vehicle control device 1 may be an actuator ECU that individually controls the travel actuators of the vehicle 2. The dedicated computer of the vehicle control device 1 may be a locator ECU that estimates a state quantity of the vehicle 2 including its own position. The dedicated computer of the vehicle control device 1 may be a navigation ECU that navigates a travel route of the vehicle 2. The dedicated computer that constitutes the vehicle control device 1 may be an HCU (i.e., HMI (i.e., Human Machine Interface) Control Unit) that controls information presentation of the information presentation system of the vehicle 2.

The vehicle control device 1 including such dedicated computer has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one of, for example, a CPU (Central Processing Unit), a GPU (Graphics Processing Unit), an RISC (Reduced Instruction Set Computer) CPU, and so on.

The processor 12 executes multiple instructions included in a vehicle control program stored in the memory 10. Accordingly, the vehicle control device 1 constructs a plurality of functional units (that is, functional blocks) for controlling the vehicle 2. As described above, in the vehicle control device 1, the functional blocks are built by causing the processor 12 to execute multiple instructions of the vehicle control program stored in the memory 10 for controlling the vehicle 2. As shown in FIG. 3, the plurality of functional units of the vehicle control device 1 include an extraction unit 100 a control unit 120.

In each control cycle, the extraction unit 100 receives the distance image Iord as the reflected light image Ior from the optical sensor 40 and the camera image Ic from the sensing camera 41. The extraction unit 100 is configured to extract unmatched pixel group Po by comparing the distance image Iord and the camera image Ic. The extraction unit 100 includes an pixel interpolation unit 102, an edge detection unit 104, and a matching determination unit 106 as sub-functional units.

Figure 7:
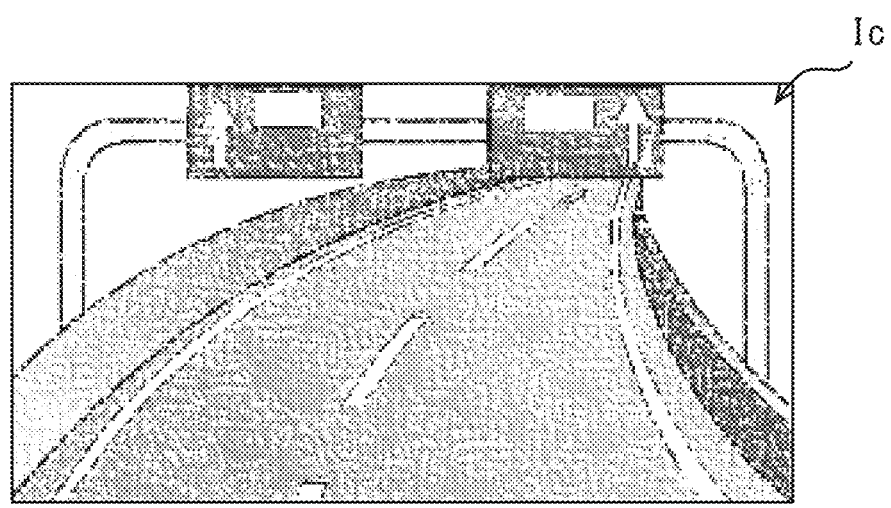
FIG. 7 is a diagram illustrating an interpolated image acquired by the sensing camera according to the first embodiment.

The pixel interpolation unit 102 is configured to interpolate pixels of a low resolution one to a high resolution one of the distance image Iord as the reflected light image Ior and the camera image Ic. In the present embodiment, the number of the pixels for capturing the overlapping area Aoc of the sensing areas Ao, Ac is larger in the camera image Ic than the distance image Iord. That is, the camera image Ic is the higher resolution one and the distance image Iord is the lower resolution one. Accordingly, the pixel interpolation unit 102 interpolates the pixel value of each pixel coordinate of the camera image Ic to each pixel coordinate of the distance image Iord. As a result of the interpolation, the pixel interpolation unit 102 generates, for the overlapping area Aoc, the camera image Ic having substantially the same resolution as the distance image Iord as shown in FIG. 7.

The edge detection unit 104 is configured to detect edges from the interpolated camera image Ic by performing at least one edge filter processing on the interpolated camera image Ic. The edge detection unit 104 is also configured to detect edges from the distance image Iord, which is the reflected light image Ior of the overlapping area Aoc having substantially the same resolution as the camera image Ic by the interpolation, by performing at least one edge filter processing.

Figure 5:
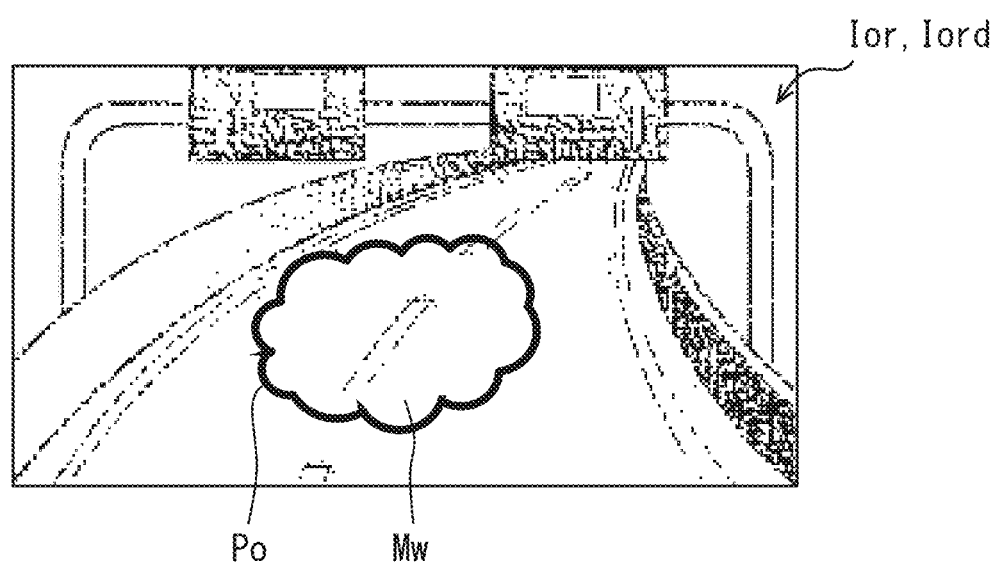
FIG. 5 is a diagram illustrating an image acquired by the optical sensor according to the first embodiment.

The matching determination unit 105 is configured to determine the matching status of the distance image Iord as the reflected light image Ior and the camera image Ic by comparing the edges from detected from these images. Specifically, the matching determination unit 106 normalizes the pixels of the edges and calculates differences, and determines that they are unmatched when a pixel having the difference exceeding a matching range is detected. In the first embodiment, the unmatched determination due to water-related substance Mw (described later) that is present in the distance image Iord but not in the camera image Ic is determined based on at least one of the past and present comparison of the images Iord, Ic and object recognition. This is to avoid the unmatched determination caused by a specular reflection object such as a block car body other than the water-related substance which exists in the camera image Ic but not in the distance image Iord. As a result, the matching determination unit 106 extracts the pixel group Po corresponding to edges in the distance image Iord that are unmatched with the camera image Ic, as shown in FIG. 5. The pixel group means a group of multiple pixels, and the pixel group Po determined to be unmatched may be multiple adjacent pixels. For convenience of explanation, in FIG. 5, the unmatched pixel group Po is indicated by attaching a symbol Po to a thick solid line circle.

As shown in FIG. 3, the control unit 120 receives the pixel group Po of the distance image Iord as the reflected light image Ior extracted by the unmatched determination by the matching determination unit 106. As shown in FIG. 5, it is estimated that the unmatched pixel group Po corresponds to water-related substance Mw which is easy to be sensed by the reflected light of the intense laser light. The water-related substance Mw is at least one of rain (including raindrop), fog, water vapor (including components in exhaust gas), and sludge containing water, for example. For convenience, the example in FIG. 5 schematically shows the presence of fog as a water-related substance Mw.

The control unit 120 receives the value of a reflection point distance dr which is the pixel value of the unmatched pixel group of the distance image Iord from the matching determination unit 106. The control unit 120 determine the reflection point distance dr in the unmatched pixel group Po by comparing with the predetermined reference range. The reference range is shorter than a threshold value for the reflection point distance dr. The reference range may be equal to or shorter than the threshold value. The threshold value for the reference range may be 1-3 m when the vehicle 2 stops, and 3-10 m when the vehicle 2 is traveling, for example. The threshold that defines the reference range may be set to an appropriate value among such exemplary values. Under these provisions and settings, the control unit 120 predicts that the water-related substance Mw, which is estimated to correspond to the unmatched pixel group Po, is likely to adhere to the incident surface 33o of the optical sensor 40 when the reflection point distance dr is within the reference range. Such water-related substance Mw which is predicted to adhere to the incident surface 33o may be rain, fog, water vapor, sludge, and the like.

Accordingly, when the control unit 120 determines that the water-related substance Mw corresponding to the unmatched pixel group Po adheres to the incident surface 33c of the optical sensor 40, the control unit 120 instructs the cleaning system 5 of the vehicle 2 in the automated driving mode to clean the incident surface 33c of the optical sensor 40. In response to the instruction, the cleaning system 5 performs a cleaning processing for the incident surface 33o by actuating the cleaning module 50o corresponding to the incident surface 33o as shown in FIG. 2. At this time, the cleaning instruction for the incident surface 33c of the sensing camera 41 is not necessary, and the cleaning module 50c is not essential. However, when it is predicted that the water-related substance adheres to the incident surface 33o of the optical sensor 40, the cleaning control may be performed as the water-related substance Mw also adheres to the incident surface 33c of the sensing camera 41 adjacent to the optical sensor 40.

Figure 8:
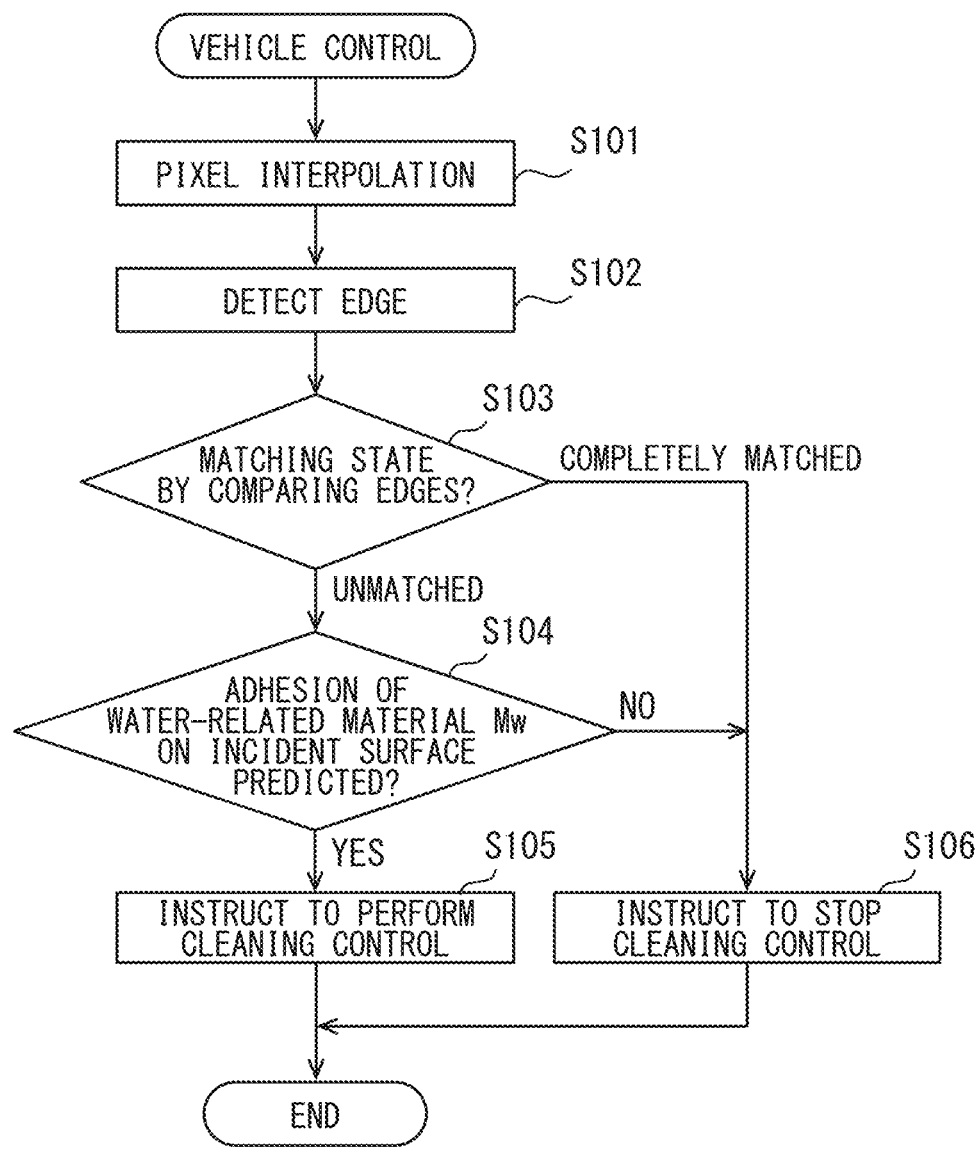
FIG. 8 is a flow chart showing a vehicle control method according to the first embodiment.

The flow of the vehicle control method for controlling the vehicle 2 by the vehicle control device 1 using the functional units 100, 120 will be described below with reference to FIG. 8. Further, in this flow, "S" means steps of the process executed by instructions included in the vehicle control program.

In S101, the pixel interpolation unit 102 of the extraction unit 100 interpolates the high resolution camera image Ic in accordance with the low resolution distance image Iord as the reflected light image Ior. Subsequently, in S102, the edge detection unit 104 of the extraction unit 100 detects the edges from the distance image Iord and the camera image Ic. In S103, the matching determination unit 106 of the extraction unit 100 determines the matching status of the distance image Iord and the camera image Ic by comparing the edges from detected from these images.

When the pixel group Po of the distance image Iord as the reflected light image Ior which is determined to be unmatched with the camera image Ic is extracted in S103, the flow proceeds to S104. In S104, the control unit 120 determines, based on the reflection point distance dr of the unmatched pixel group Po, whether the water-related substance Mw estimated to correspond to the unmatched pixel group Po adheres to the incident surface 330 of the optical sensor 40.

As a result of S104, when it is predicted that the water-related substance Mw adheres to the incident surface 33o since the reflection point distance dr of the unmatched pixel group Po is within the reference range, the flow proceeds to S105. In S105, the control unit 120 instructs the cleaning system 5 to clean the incident surface 33o of the optical sensor 40 as the control of the vehicle 2 in the automated driving mode.

When the images are completely matched and the unmatched pixel group Po is not extracted in S103, and when it is not predicted that the water-related substance Mw adheres to the incident surface 33o in S104, the flow proceeds to S106. In S106, the control unit 120 instructs the cleaning system 5 to stop the cleaning control. Accordingly, in the first embodiment, S101, S102, S103 correspond to an extraction process, and S104, S105, S106 correspond to a control process.

(Operation Effect)

The operation and effects of the first embodiment described above will be described below.

According to the first embodiment, the reflected light image Ior acquired using the optical sensor 40 by sensing the reflected light of the irradiated light is compared with the camera image Ic acquired by the sensing camera 41 based on the outside light intensity in the overlapping sensing area Ac. The unmatched pixel group Po extracted by such comparison can be estimated to correspond to the water-related substance Mw whose reflected light is easily sensed, i.e. the water-related substance Mw likely to be captured in the reflected light image Ior. Accordingly, by instructing the control to the vehicle 2 based on the estimated water-related substance Mw, the vehicle control can be more accurate.

According to the first embodiment, the cleaning system 5 is installed in the vehicle 2 for cleaning the incident surface 33o of the optical sensor 40 on which the light from the sensing area Ao. Accordingly, it can be accurately estimated that the unmatched pixel group Po extracted by comparing the reflected light image Ior acquired by the optical sensor 40 and the camera image Ic acquired by the sensing camera 41 corresponds to the water-related substance Mw. Accordingly, since the cleaning system 5 of the vehicle 2 in the automated driving mode is instructed to clean the incident surface 33o to which the water-related substance Mw is likely to adhere, the cleaning control can be accurately performed.

According to the first embodiment, the distance image Iord compared with the camera image Ic is the reflected light image Ior according to the reflection point distance dr of the reflected light of the irradiated light. The unmatched pixel group Po extracted by such comparison can be estimated to correspond to the water-related material Mw whose reflection point distance dr is easily sensed, i.e. the water-related material Mw likely to be captured in the distance image Iord. Accordingly, the cleaning control is instructed based on the estimated water-related substance Mw, and the cleaning control can be performed more accurately.

According to the first embodiment, among the unmatched pixel group Po, the pixel group Po whose reflection point distance dr in the distance image Iord as the reflected light image Ior within the reference range can be accurately estimated to correspond to the water-related substance Mw which is predicted to be located within the reference range and be likely to adhere to the incident surface 33o of the optical sensor 40. Accordingly, the cleaning of the incident surface 33o in a situation where the water-related substance Mw is likely to adhere to the incident surface 33o can be adequately instructed to control the cleaning.

According to the comparison of the edges of the reflected light image Ior and the camera image Ic of the first embodiment, the unmatched pixel group Po can be accurately extracted from the edges. Accordingly, the control according to the water-related substance Mw estimated to correspond to the unmatched pixel group Po can be adequately instructed.

According to the first embodiment, the higher resolution one of the reflected light image Ior and the camera image Ic is interpolated to the lower resolution one, and then the images Ior, Ic are compared with each other. According to such comparison, it is possible to prevent a situation in which a pixel group that should be matched is erroneously extracted due to a difference in resolution. Accordingly, the control according to the water-related substance Mw estimated to correspond to the unmatched pixel group Po can be adequately instructed.

Second Embodiment

A second embodiment is a modification of the first embodiment.

Figure 9:
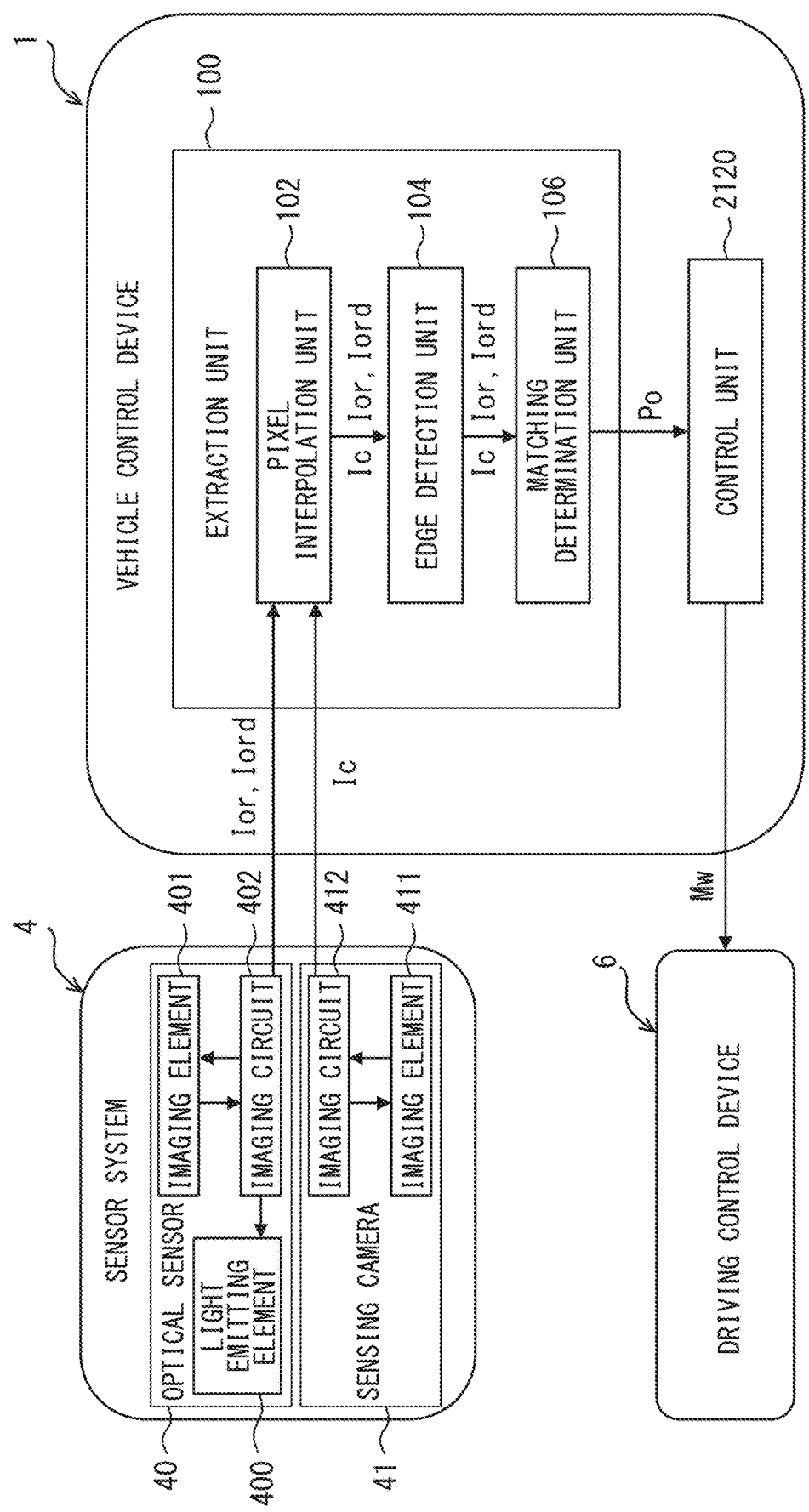
FIG. 9 is a block diagram showing the function configuration of a vehicle control device according to a second embodiment.

As shown in FIG. 9, a driving control device 6 is mounted in the vehicle 2 of the second embodiment. The driving control device 6 is configured to perform the driving control of the vehicle 2 having the automated mode based on sensing information acquired by the sensor system 4 in cooperation with the automated driving unit ADU. The driving control device 6 includes at least one dedicated computer such as ECU in the vehicle 2 described in the first embodiment, for example. The cleaning system 5 of the second embodiment is not essential, and the cleaning system 5 is omitted in FIG. 9.

The control unit 2120 of the second embodiment does not receive the reflection point distance dr of the unmatched pixel group Po, and the determination about the reflection point distance dr is not performed. The control unit 2120 instructs the driving control device 6 of the vehicle 2 in the automated driving mode to exclude the unmatched pixel group Po which is estimated to correspond to the water-related substance Mw from the recognition of obstacles.

Figure 10:
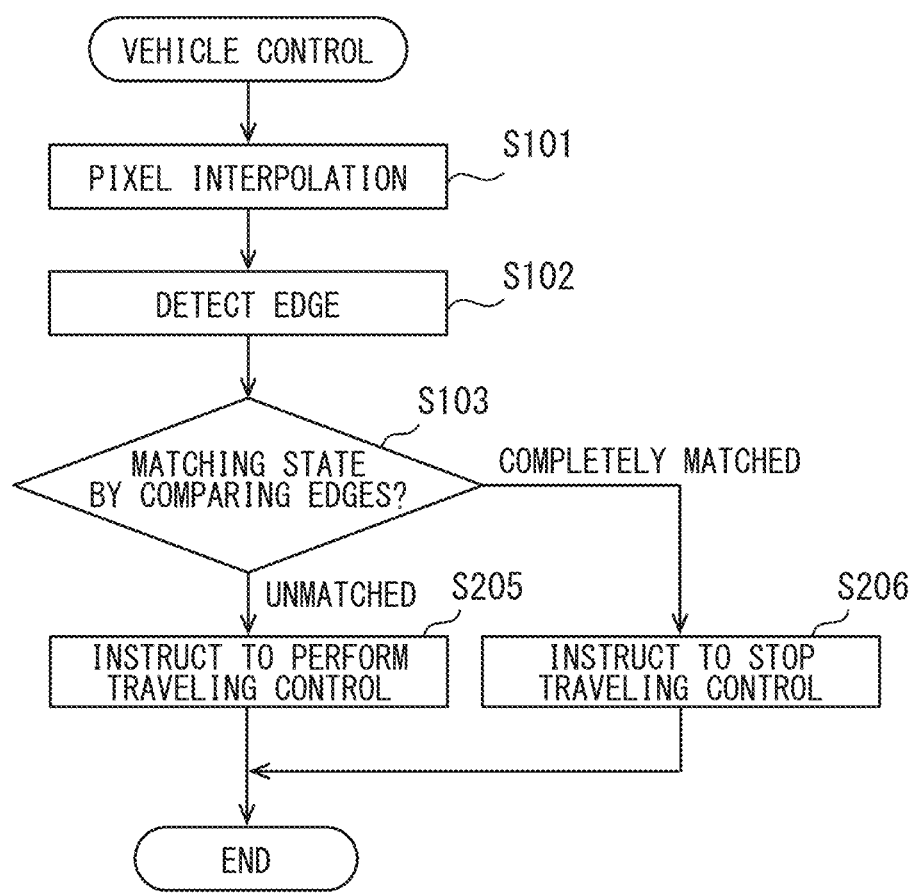
FIG. 10 is a flow chart showing a vehicle control method according to the second embodiment.

In the flow of the vehicle control method according to the second embodiment, as shown in FIG. 10, S101, S102, S103 are performed as in the first embodiment, and S205, S206 are performed instead of S104, S105, S106. Specifically, in S205, the control unit 2120 instructs the driving control to the driving control device 6 of the vehicle 2 in the automated driving mode to exclude the water-related substance Mw from the recognition of obstacles. In contrast, in S206, the control unit 2120 instructs the driving control to the driving control device 6 to stop excluding the water-related substance Mw from the recognition of obstacles. Accordingly, in the second embodiment, S101, S102, S103 correspond to an extraction process, and S205, S206 correspond to a control process.

(Operation Effect)

The operation and effect of the second embodiment described above will be described below.

According to the second embodiment, the driving control is instructed to the vehicle 2 to exclude, from the recognition of obstacles, the water-related substance Mw which is estimated to correspond to the unmatched pixel group Po extracted by comparing the reflected light image Ior and the camera image Ic. According to this, it is possible to ensure the continuity of the automated driving mode by performing proper driving control that prevents the water-related substance Mw from being erroneously recognized as an obstacle.

Third Embodiment

A third embodiment is a modification of the first embodiment.

Figure 11:
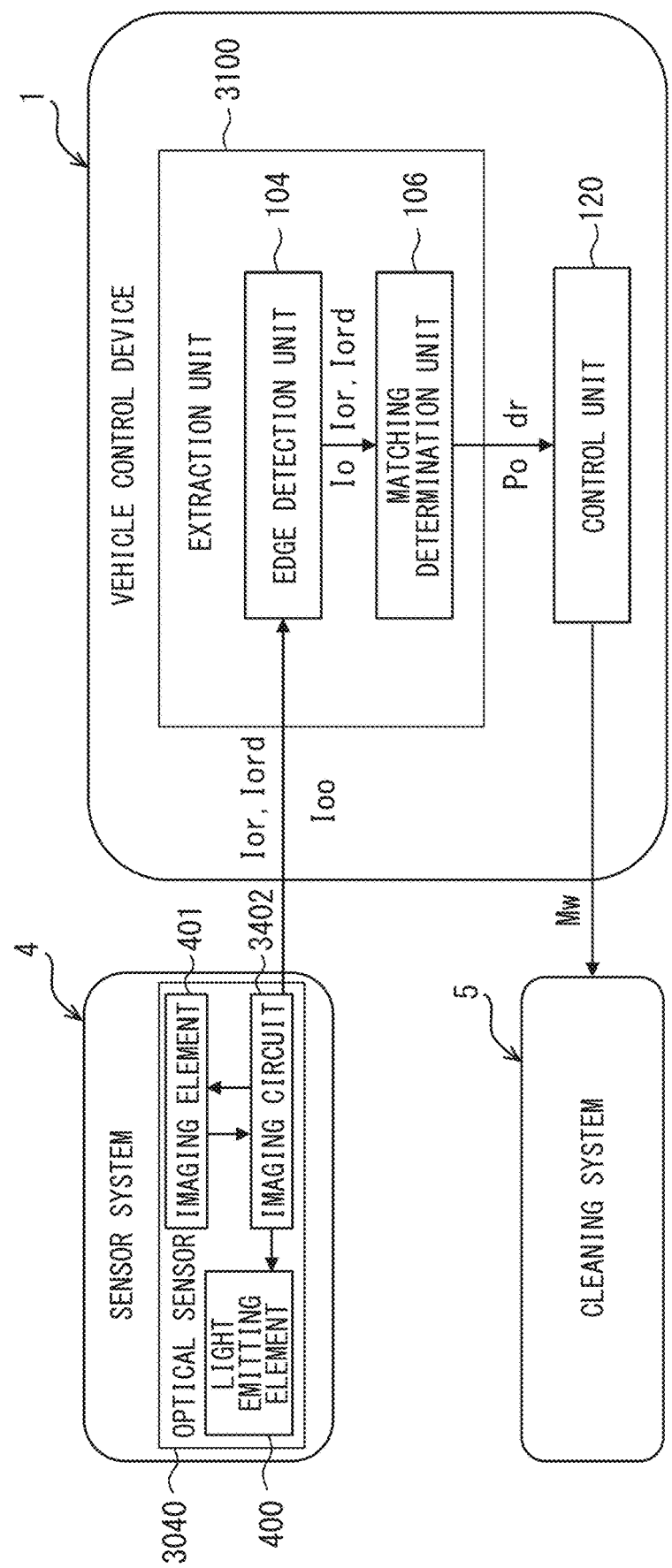
FIG. 11 is a block diagram showing the function configuration of a vehicle control device according to a third embodiment.

As shown in FIG. 11, the optical sensor 3040 of the third embodiment is configured to acquire images while the light irradiation stops in addition to acquiring the reflected light image Ior while the light is irradiated according to the first embodiment. Specifically, in an outside light mode in which the imaging circuit 3402 exposes the imaging element 401 while intermittent light irradiation from the light emitting element 400 is stopped, an object in the sensing area Ao is a reflection point of the outside light. As a result, the outside light reflected at the reflection point is incident on the imaging element 401 through the incident surface 33o. At this time, the imaging circuit 3402 scans multiple pixels of the imaging element 401 to sense the reflected outside light.

Figure 12:
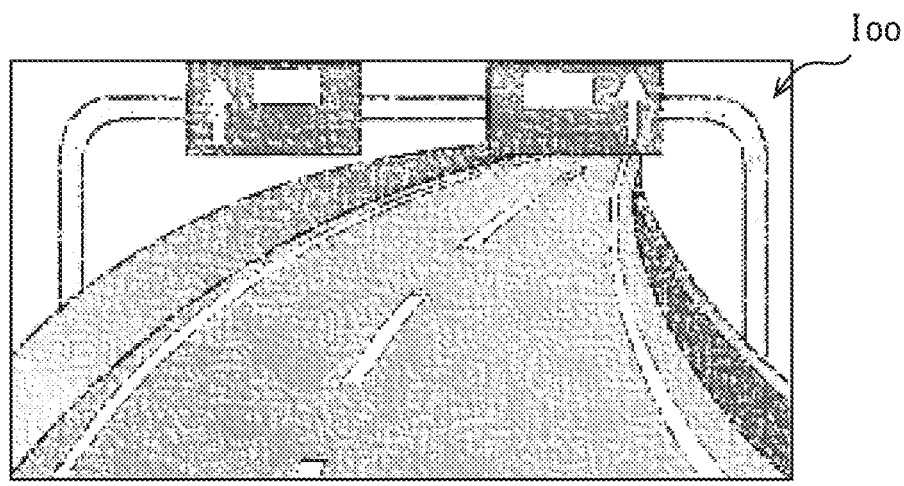
FIG. 12 is a diagram illustrating an image acquired by the optical sensor according to the third embodiment.

The imaging circuit 3402 converts luminance value acquired for each pixel based on intensity of the sensed outside light into two-dimensional data as pixel value to acquire an outside light image Ioo shown in FIG. 12. The outside light sensed in acquiring the outside light image Ioo is realized by the imaging element 401 as in the sensing of the reflected light in acquiring the reflected light image Ior. The sensing camera 41 in the third embodiment is not essential, and the sensing camera 41 is omitted in FIG. 11.

The extraction unit 3100 sequentially receives the distance image Iord as the reflected light image Ior and the outside light image Ioo from the optical sensor 3040 for each control cycle. Since the element 401 senses as described above, the pixel interpolation unit 102 which is the sub-functional unit of the extraction unit 3100 is omitted. The extraction unit 3100 realizes the functions of the edge detection unit 104 and the matching determination unit 106 on the outside light image Ioo instead of the camera image Ic and the reflected light image Ior according to the first embodiment.

Figure 13:
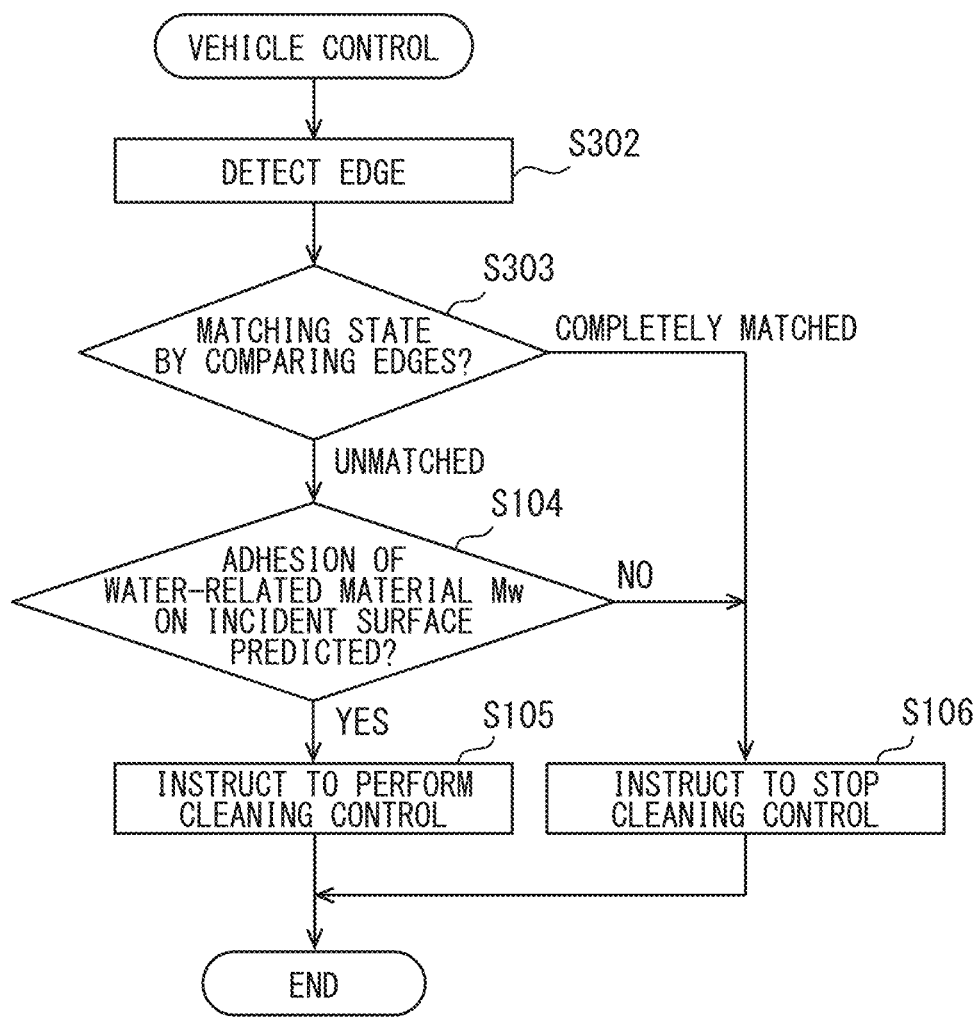
FIG. 13 is a flow chart showing a vehicle control method according to the third embodiment.

In the flow of the vehicle control method according to the third embodiment, the edge detection unit 103 of the extraction unit 3100 detects the edges from the distance image Iord as the reflected light image Ior and the outside light image Ioo in S302 as shown in FIG. 13. In S303, the matching determination unit 106 of the extraction unit 3100 determines the matching status of the distance image Iord and the outside light image Ioo by comparing the edges from detected from these images.

S104, S105, and S106 subsequent to S303 are executed as in the first embodiment. Accordingly, in the third embodiment, S302, S303 correspond to an extraction process, and S104, S105, S106 correspond to a control process.

(Operation Effect)

Hereinbelow, effects of the above third embodiment will be described.

According to the third embodiment, the reflected light image Ior acquired by the optical sensor 3040 by sensing the reflected light of the irradiated light is compared with the outside light image Ioo acquired by the optical sensor 3040 according to the intensity of the outside light while the irradiation of the light is stopped. The unmatched pixel group Po extracted by such comparison can be estimated to correspond to the water-related substance Mw whose reflected light is easily sensed, i.e. the water-related substance Mw likely to be captured in the reflected light image Ior. Accordingly, by instructing the control to the vehicle 2 based on the estimated water-related substance Mw, the vehicle control can be more accurate.

According to the third embodiment, the cleaning system 5 is installed in the vehicle 2 for cleaning the incident surface 33o of the optical sensor 3040 on which the light from the sensing area Ao. Accordingly, it can be accurately estimated that the unmatched pixel group Po extracted by comparing the reflected light image Ior and the outside light image Ioo acquired by the optical sensor 3040 corresponds to the water-related substance Mw. Accordingly, since the cleaning system 5 of the vehicle 2 in the automated driving mode is instructed to clean the incident surface 33o to which the water-related substance Mw is likely to adhere, the cleaning control can be accurately performed.

According to the third embodiment, the distance image Iord compared with the outside light image Ioo is the reflected light image Ior according to the reflection point distance dr of the reflected light of the irradiated light. The unmatched pixel group Po extracted by such comparison can be estimated to correspond to the water-related substance Mw whose reflection point distance dr is easily sensed, i.e. the water-related substance Mw likely to be captured in the distance image Iord. Accordingly, the cleaning control is instructed based on the estimated water-related substance Mw, and the cleaning control can be performed more accurately.

According to the third embodiment, among the unmatched pixel group Po, the pixel group Po whose reflection point distance dr in the distance image Iord as the reflected light image Ior within the reference range can be accurately estimated to correspond to the water-related substance Mw which is predicted to be located within the reference range and be likely to adhere to the incident surface 33o of the optical sensor 3040. Accordingly, the cleaning of the incident surface 33c in a situation where the water-related substance Mw is likely to adhere to the incident surface 33o can be adequately instructed to control the cleaning.

According to the third embodiment, regarding the reflection point distance dr sensed by the same element 401 of the optical sensor 3040 which sensed the outside light intensity, a situation where an error occurs in the determination about the reference range due to the axis misalignment can be suppressed. Accordingly, the cleaning of the incident surface 33o on which the water-related substance Mw is predicted to adhere based on the pixel group Po whose reflection point distance dr is within the reference range can be adequately instructed and controlled.

Fourth Embodiment

A fourth embodiment is a modification of the third embodiment.

Figure 14:
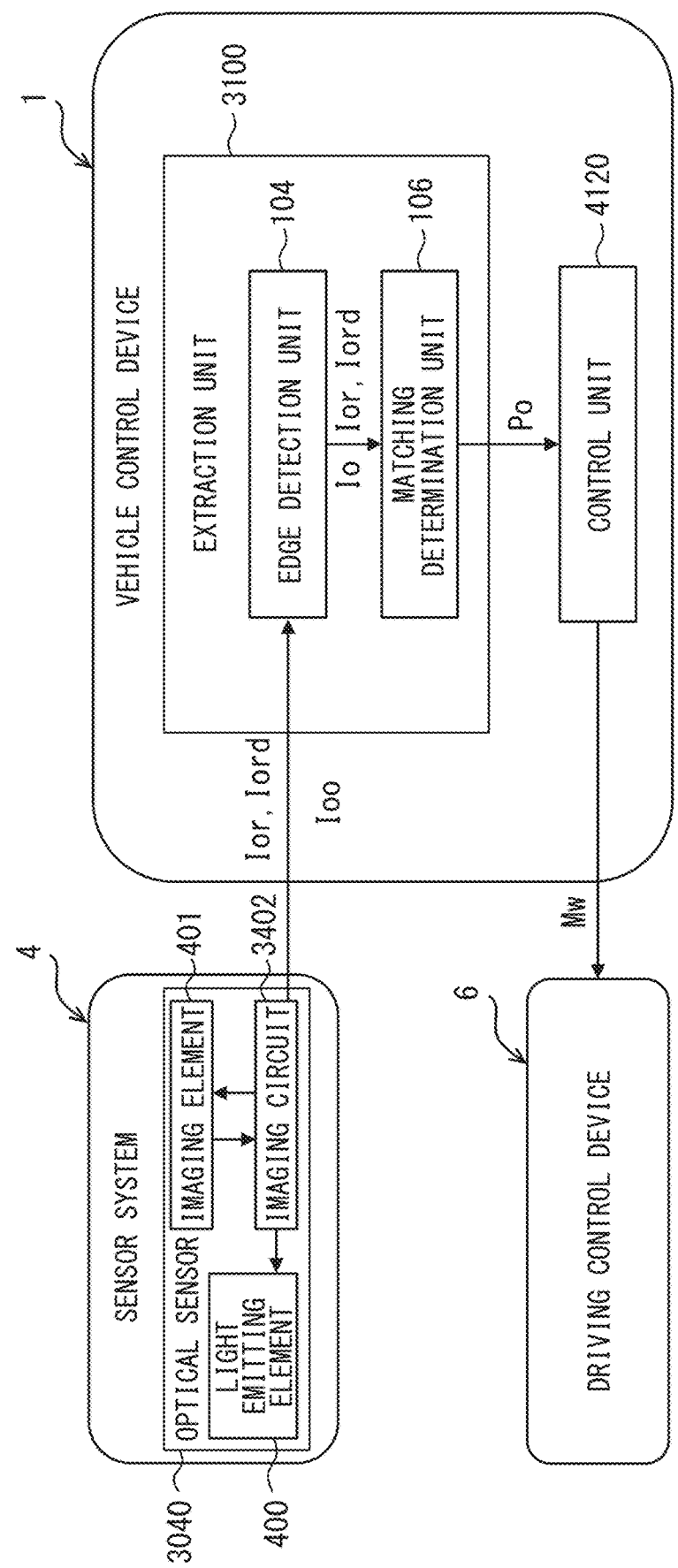
FIG. 14 is a block diagram showing the function configuration of a vehicle control device according to a fourth embodiment.

As shown in FIG. 14, a driving control device 6 according to the second embodiment is mounted in the vehicle 2 of the fourth embodiment. In addition, the control unit 4120 of the fourth embodiment has a function of commanding the travel control according to the second embodiment. The cleaning system 5 of the fourth embodiment is not essential, and the cleaning system 5 is omitted in FIG. 14.

Figure 15:
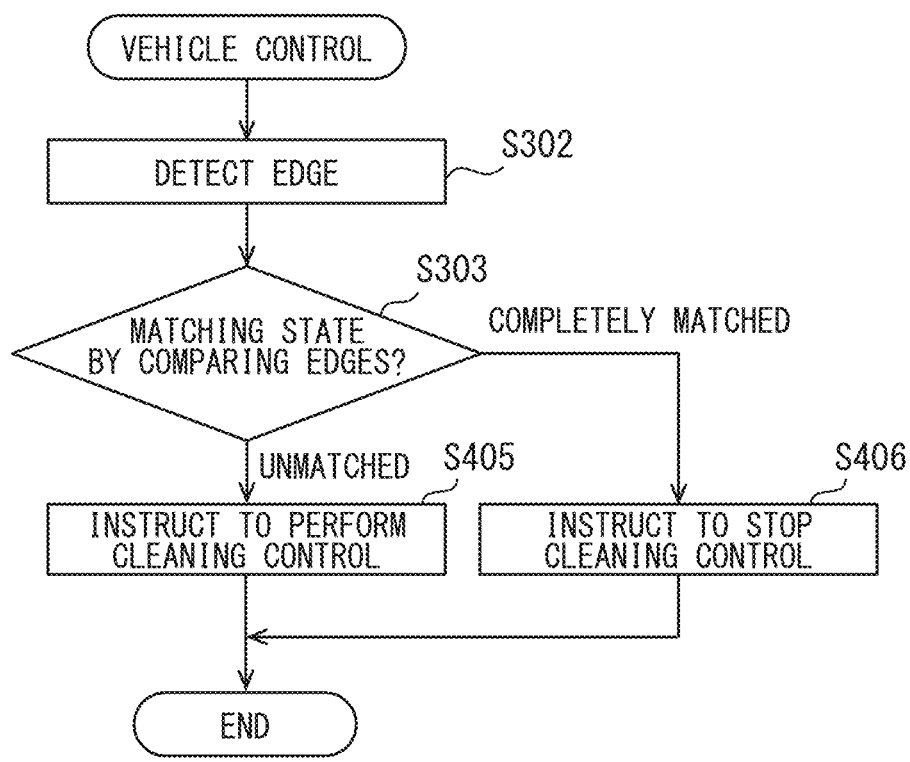
FIG. 15 is a flow chart showing a vehicle control method according to the fourth embodiment.

In the flow of the vehicle control method according to the fourth embodiment, as shown in FIG. 15, S302, S303 are performed as in the third embodiment, and S405, S406 based on S205, S206 are performed instead of S104, S105, S106. That is, in S405, the control unit 4120 instructs the driving control to the driving control device 6 of the vehicle 2 in the automated driving mode to exclude the water-related substance Mw from the recognition of obstacles. In contrast, in S406, the control unit 4120 instructs the driving control to the driving control device 6 to stop excluding the water-related substance Mw from the recognition of obstacles. Accordingly, in the fourth embodiment, S302, S303 correspond to an extraction process, and S405, S406 correspond to a control process.

(Operation Effect)

Hereinbelow, effects of the above fourth embodiment will be described.

According to the fourth embodiment, the driving control is instructed to the vehicle 2 to exclude, from the recognition of obstacles, the water-related substance Mw which is estimated to correspond to the unmatched pixel group Po extracted by comparing the reflected light image Ior and the outside light image Ioo. According to this, it is possible to ensure the continuity of the automated driving mode by performing proper driving control that prevents the water-related substance Mw from being erroneously recognized as an obstacle.

Fifth Embodiment

A fifth embodiment is a modification of the first embodiment. Hereinafter, in the description of the fifth embodiment, the incident surface 33c of the sensing camera 41 is referred to as a camera incident surface 33c, and the incident surface 33o of the optical sensor 40 is referred to as an optical incident surface 33o.

Figure 16:
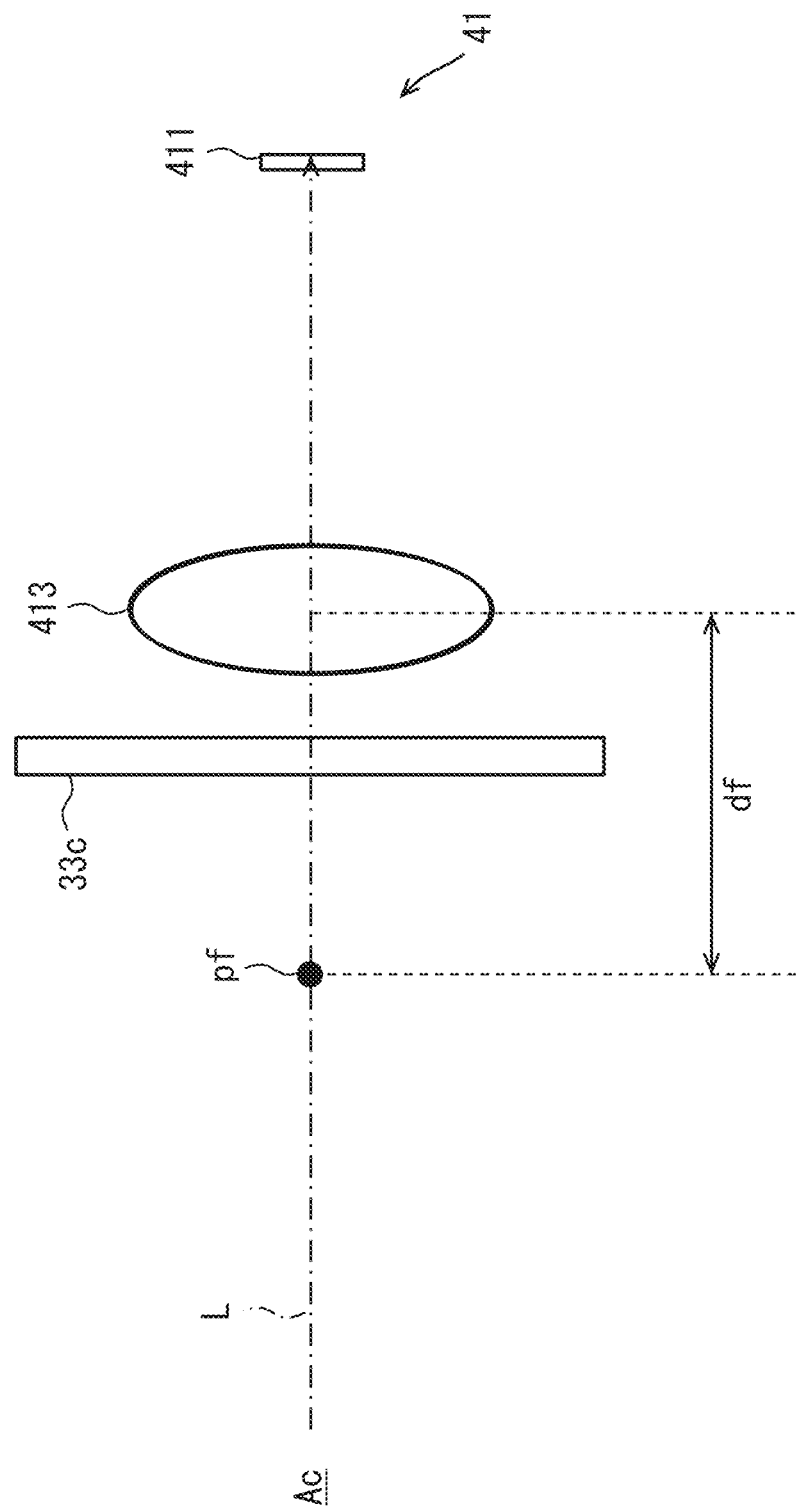
FIG. 16 is a schematic diagram illustrating detailed configurations of a sensing camera according to a fifth embodiment.

As shown in FIG. 16, in the sensing camera 41 of the fifth embodiment which is the same as the first embodiment, the camera incident surface 33c on which the light is incident from the sensing area Ac overlapping with the sensing area of the optical sensor 40 is located inside, on an optical axis L, of an outside focal point pf of an imaging lens system 413 that images the incident light on the imaging element 411. That is, the camera incident surface 33c is located within the focal point distance df on the sensing area Ac side of the imaging lens system 413. Within the focal point distance df, there is a high probability that the edges of the water-related substance Mw will be undetected in the camera image Ic by the sensing camera 41, even by edge filter processing.

Figure 17:
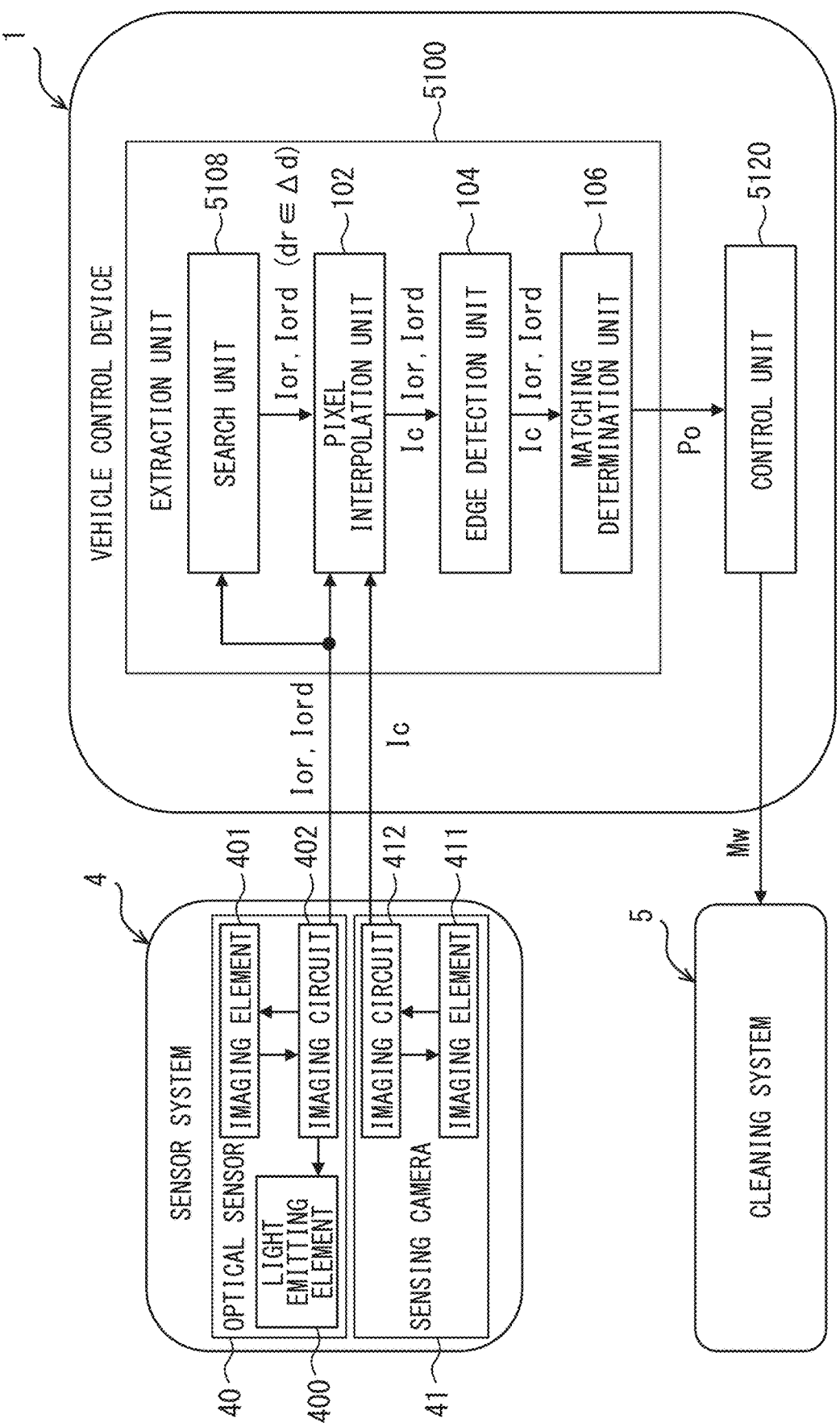
FIG. 17 is a block diagram showing the function configuration of a vehicle control device according to the fifth embodiment.

As shown in FIG. 17, the extraction unit 5100 of the fifth embodiment has a search unit 5108 as a sub-functional unit in addition to the pixel interpolation unit 102, the edge detection unit 104, and the matching determination unit 106. The search unit 5108 is configured to search for an object (hereinafter, referred to as a in-reference range object) whose reflection point distance dr in the distance image Iord acquired by the optical sensor 40 is within the reference range Δd. This means searching for an object near the optical incident surface 33o where the reflection point distance dr is within the reference range Δd. The reference range Δd in the fifth embodiment is set as a range in which the edge of the water-related substance Mw can be detected in the distance image Iord acquired by the optical sensor 40 by the edge filter processing based on the focal point distance df on the sensing area Ac side of the imaging lens system 413.

In the fifth embodiment, the edges are detected by the edge detection unit 104 from the distance image Iord containing the object within the reference range searched by the search unit 5108 and the camera image Ic interpolated by the pixel interpolation unit 102, and the detected edges are compared with each other by the matching determination unit 106. Accordingly, the matching determination unit 106 can extract, as the unmatched pixel group Po unmatched with the camera image Ic, the pixel group Po representing the edge of the object within the reference range in the distance image Iord.

When the unmatched pixel group Po representing the edge of the in-reference range object is extracted, the control unit 5120 of the fifth embodiment determines that the adhesion on the optical incident surface 33o of the water-related substance Mw which is estimated to correspond to the unmatched pixel group Po is predicted. That is, when the reflection point distance dr of the unmatched pixel group Po is within the reference range Δd according to the focal point distance df, the adhesion of the water-related substance Mw on the optical incident surface 33o is predicted by the control unit 5120.

When the reflection point distance df of the unmatched pixel group Po is within the reference range Δd, the control unit 5120 determines that the adhesion of the water-related substance Mw on the optical incident surface 33o is predicted, the control unit 5120 instructs, to the cleaning system 5, to clean the optical incident surface 33o by the cleaning gas. After the control unit 5120 instructed, when the pixel group Po whose reflection point distance dr within the reference range Δd is extracted from the distance image Iord by the extraction unit 5100, the control unit 5120 instructs, to the cleaning system 5, to clean the optical incident surface 33o by the cleaning liquid. The edge of the unmatched pixel group Po in the distance image Iord before the cleaning using the cleaning gas is also extracted by the edge detection unit 104 from the latest distance image Iord after the cleaning. When the pixel group Po whose reflection point distance dr within the reference range Δd no longer exists in the distance image Iord after the cleaning using the cleaning gas, the control unit 5120 instructs, to the cleaning system 5, to stop the cleaning control.

Figure 18:
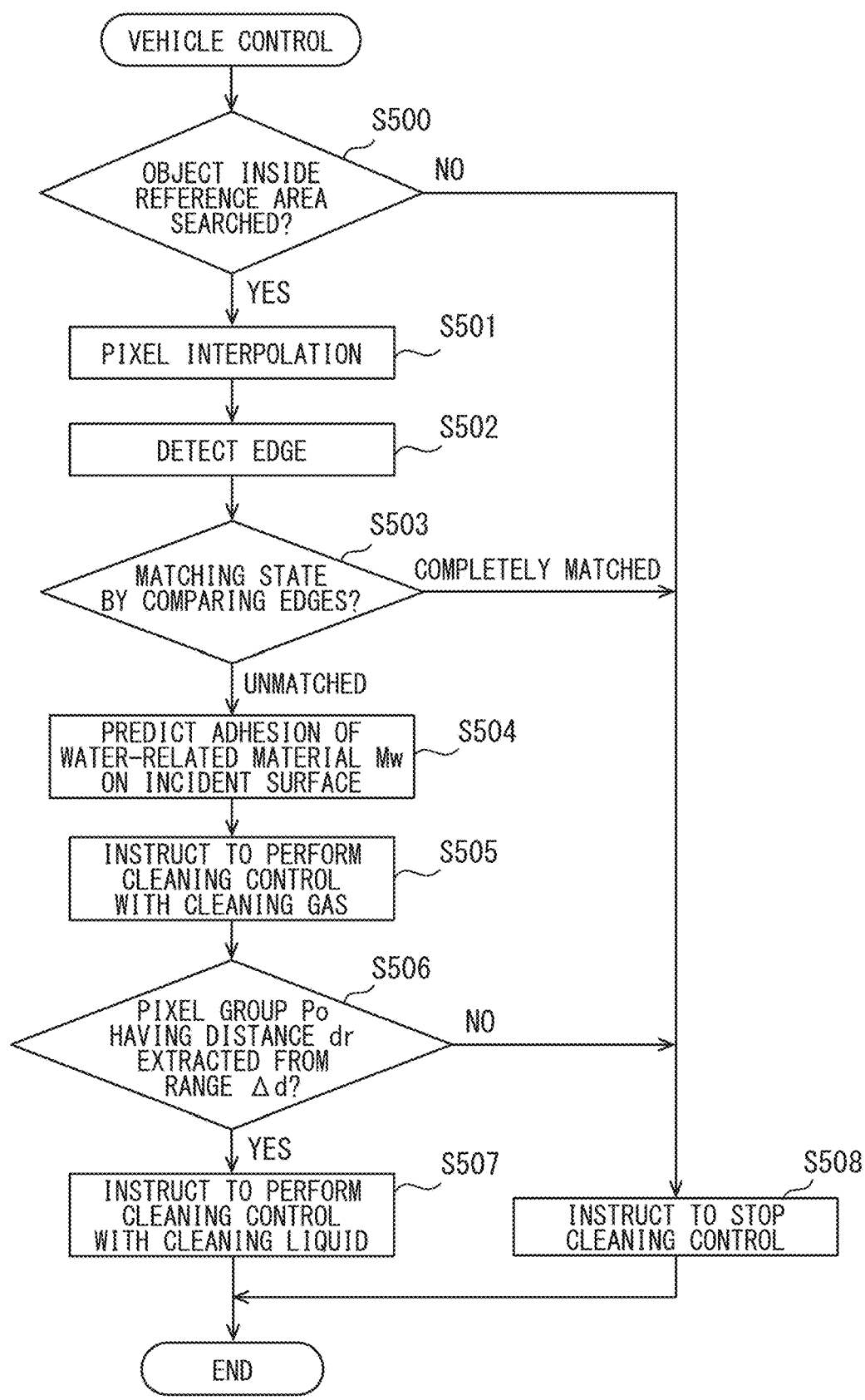
FIG. 18 is a flow chart showing a vehicle control method according to the fifth embodiment.

In the flow of the vehicle control method according to the fifth embodiment, as shown in FIG. 18, the search unit 5108 of the extraction unit 5100 searches for an object whose reflection point distance dr in the distance image Iord is within the reference range Δd, i.e. the in-reference range object, in S500. As a result, when the in-reference range object is found, the flow proceeds to S501.

In S501, the pixel interpolation unit 102 of the extraction unit 5100 interpolates the high resolution camera image Ic in accordance with the low resolution distance image Iord as the reflected light image Ior. Subsequently, in S502, the edge detection unit 104 of the extraction unit 5100 detects the edges from the distance image Iord and the camera image Ic.

In S503, the matching determination unit 106 of the extraction unit 5100 determines the matching status of the distance image Iord and the camera image Ic by comparing the edges from detected from these images. When the pixel group Po representing the edge of the in-reference range object in the distance image Iord is extracted as the unmatched pixel group Po unmatched with the camera image Ic, the flow proceeds to S504.

In S504, the control unit 5120 estimates that the unmatched pixel group Po representing the in-reference range object corresponds to the water-related substance Mw which is predicted to adhere to the optical incident surface 33o. That is, the water-related substance Mw which is estimated to correspond to the unmatched pixel group Po is predicted to adhere to the optical incident surface 33o. In S505, the control unit 5120 instructs the cleaning system 5 to clean the optical incident surface 33o using the cleaning gas as the control of the vehicle 2 in the automated driving mode.

In S506 after instructing to clean the optical incident surface 33o by the cleaning gas, the edge detection unit 104 of the extraction unit 5100 determines whether the pixel group Po whose reflection point distance dr within the reference range Δd is extracted from the distance image Iord. When the edge detection unit 104 extracted the pixel group Po whose reflection point distance dr within the reference range Δd, the flow proceeds to S507. In S507, the control unit 5120 instructs the cleaning system 5 to clean the optical incident surface 33o using the cleaning liquid as the control of the vehicle 2 in the automated driving mode.

In contrast, when the edge detection unit 104 did not extract the pixel group Po whose reflection point distance dr within the reference range Δd, the flow proceeds to S508, and the control unit 5120 instructs the cleaning system 5 to stop the cleaning control. When the object within the reference range is not found in S500, and when the pixel group Po representing the edge of the in-reference range object is not extracted in S503, the control unit 5120 instructs the cleaning system 5 to stop the cleaning control. Accordingly, in the fifth embodiment, S500, 501, S502, S503, S506 correspond to an extraction process, and S504, S505, S507, S508 correspond to a control process.

(Operation Effect)

Hereinbelow, effects of the above fifth embodiment will be described.

According to the fifth embodiment, the camera incident surface 33c on which the light is incident from the sensing area Ac of the sensing camera 41 overlapping with the optical sensor 40 is located within the focal point distance df on the sensing area Ac side in the imaging lens system 413. According to this, when the reflection point distance dr of the unmatched pixel group Po is within the reference range Δd according to the focal point distance df, the determination of the prediction that the water-related substance adheres can be accurate. Accordingly, the cleaning of the incident surface 33o in a situation where the water-related substance Mw is likely to adhere to the incident surface 33o can be adequately instructed to control the cleaning.

According the fifth embodiment, when the pixel group Po whose the reflection point distance dr within the reference range Δd is extracted from the distance image Iord, after the cleaning control using the cleaning gas in a situation where the reflection point distance dr is within the reference range Δd is instructed to the cleaning system 5, the cleaning control using the cleaning liquid is instructed to the cleaning system 5. According to this, it is possible to save the cleaning liquid by selectively using the cleaning gas and the cleaning liquid according to the type or adhesion state of the water-related substance Mw. For example, when the water-related substance Mw is rain, fog, water vapor, or the like, the cleaning liquid can be effectively used for removing dirt as the water-related substance Mw since the rain, fog, water vapor, and the like can be easily removed with the cleaning gas.

Other Embodiments

Although a plurality of embodiments have been described above, the present disclosure is not to be construed as being limited to these embodiments, and can be applied to various embodiments and combinations within a scope not deviating from the gist of the present disclosure.

The dedicated computer of the vehicle control device 1 in a modification example may be at least one outside center computer communicating with the vehicle 2. The dedicated computer of the vehicle control device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

A translucent cover 32 that forms the incident surface 33o in the modification example may be provided in the optical sensor 40, 3040. The incident surface 33o of the modification example may be an optical member such as a lens of the optical sensor 40, 3040.

The optical sensor 40, 3040 may acquire, as the reflected light image Ior, an intensity image in which luminance values acquired based on the reflected light intensity for each pixel are converted into two-dimensional data as the pixel value. In this case, the functions of the sub-functional units of the extraction unit 100, 3100 are performed using the camera image Ic or the outside light image Ioo and the intensity image that is the reflected light image Ior. However, in this case, the determination function for the reflection point distance dr performed by the control unit 120 in the first and the third embodiments may be performed based on the distance image Iord as the reflected light image Ior or omitted.

Figure 19:
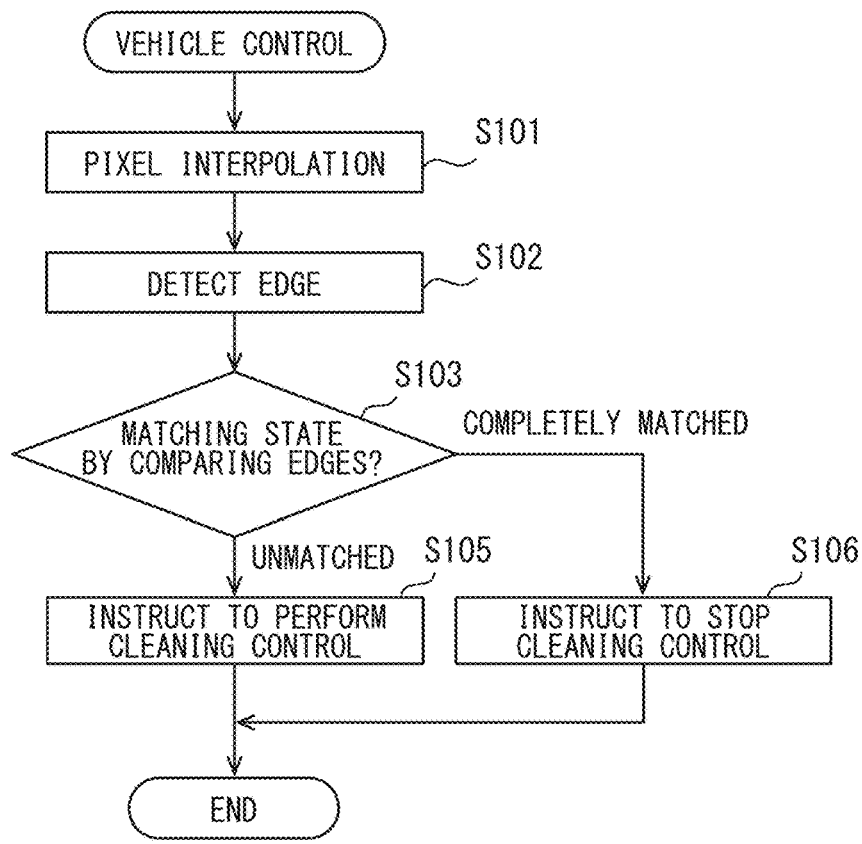
FIG. 19 is a flow chart showing a vehicle control method according to a modification example.
Figure 20:
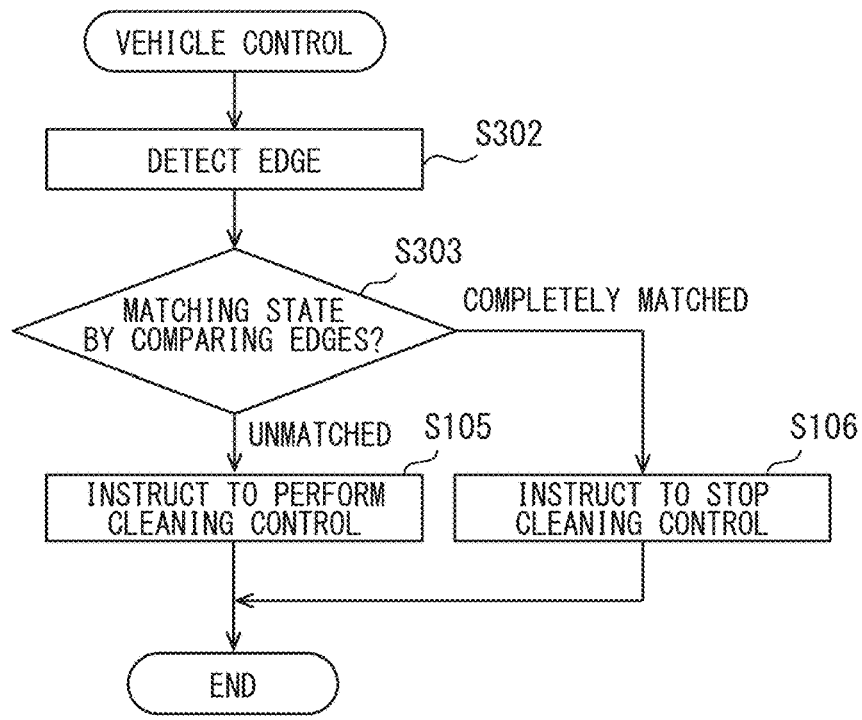
FIG. 20 is a flow chart showing a vehicle control method according to a modification example.

In the modification example, S104 of the first and third embodiments may be omitted as shown in FIGS. 19, 20. That is, in the flow of the vehicle control method, the possibility of adhesion of the water-related substance Mw to the incident surface 33o may be predicted only by the unmatched determination in S103 or S303 to perform S105.

Figure 21:
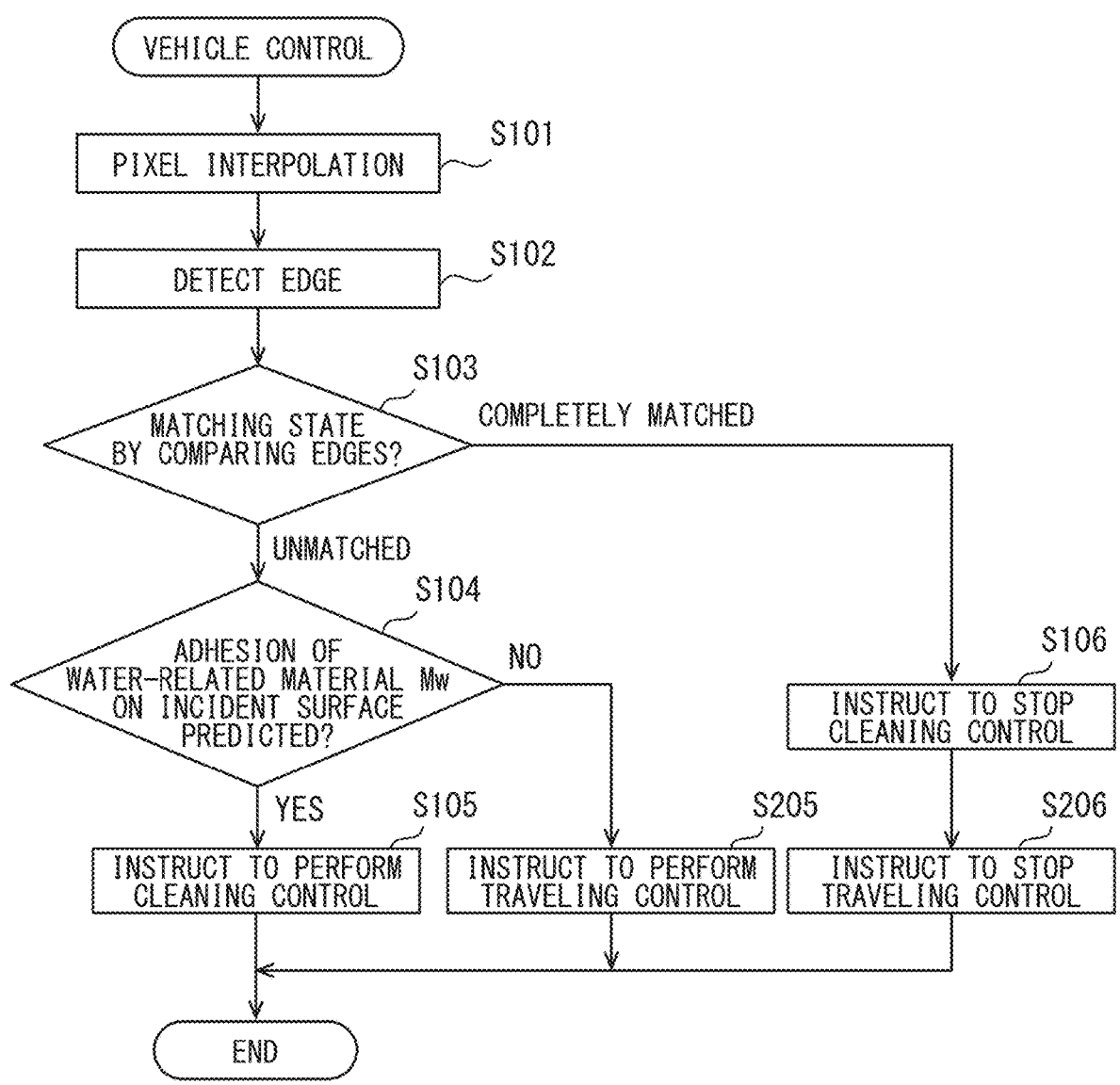
FIG. 21 is a flow chart showing a vehicle control method according to a modification example.

In the modification example, the first embodiment and the second embodiment may be combined as shown in FIG. 21. That is, the flow of the vehicle control method may proceed to S205 when it is not predicted that the water-related substance Mw adheres to the incident surface 33o in S104, and the flow may proceed to S106, S206 subsequently when completely matched in S103.

Figure 22:
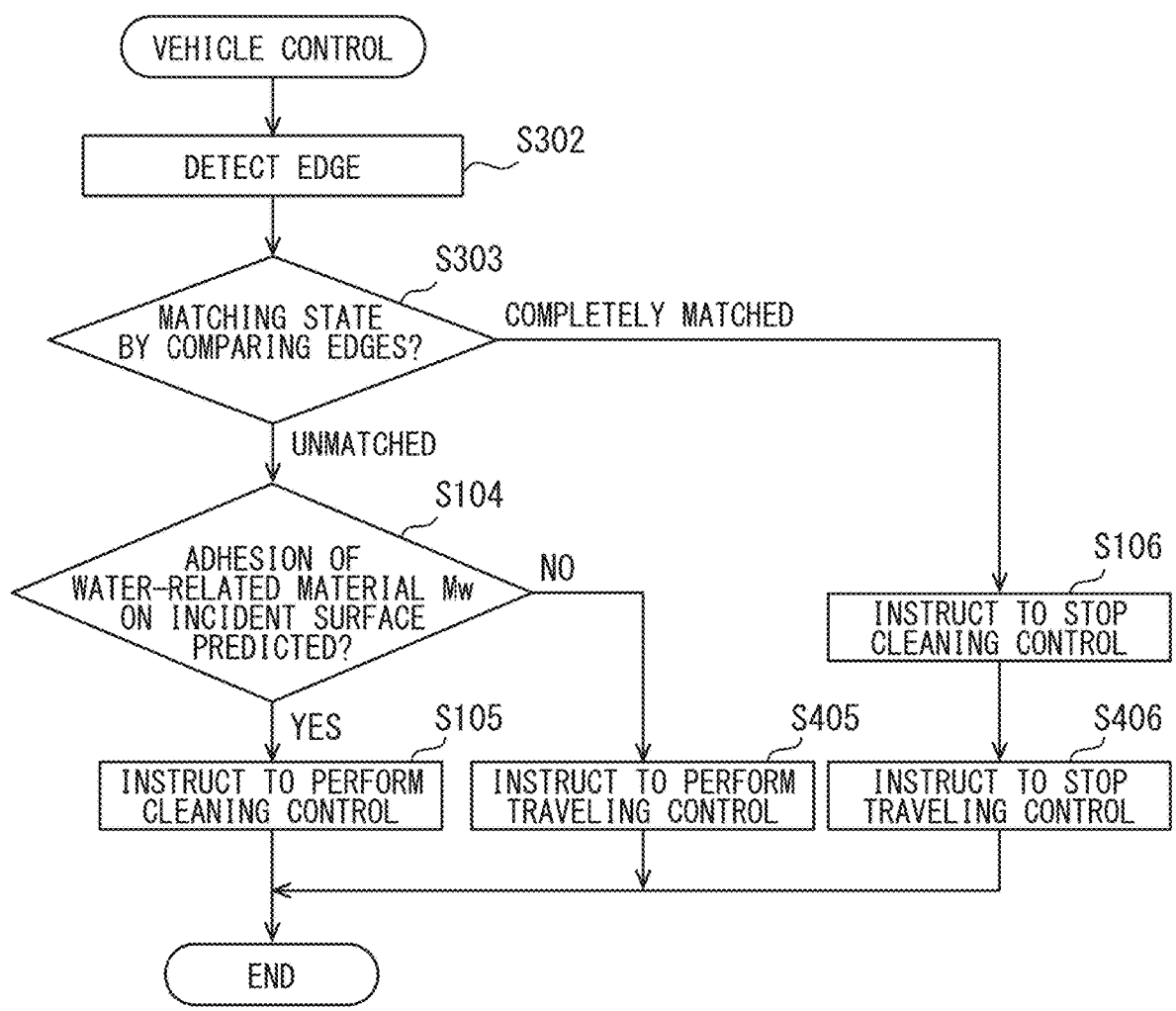
FIG. 22 is a flow chart showing a vehicle control method according to a modification example.

In the modification example, the third embodiment and the fourth embodiment may be combined as shown in FIG. 22. That is, the flow of the vehicle control method may proceed to S405 when it is not predicted that the water-related substance Mw adheres to the incident surface 33o in S104, and the flow may proceed to S106, S406 subsequently when completely matched in S303.

In the modification example, the driving control according to the second embodiment may be performed instead of the cleaning control according to the fifth embodiment. In the modification example, instead of S505-S507 according to the fifth embodiment, a step in which the control unit 5120 instructs, to the cleaning system 5, the cleaning control using at least one of the cleaning gas and the cleaning liquid may be performed. In the modification example, in S506 of the fifth embodiment, the extraction of and determination on the pixel group Po may be performed by the edge detection unit 104 of the extraction unit 5100 by performing S500-503. In the modification example, in S105 of the first and third embodiment, a step according to S506-508 of the fifth embodiment (however, the reference range is the range defined in the first embodiment) may be performed.

What is claimed is:

1. A vehicle control device configured to control a vehicle equipped with (i) an optical sensor configured to acquire a reflected light image by sensing reflected light of irradiated light, (ii) a sensing camera configured to acquire a camera image according to intensity of outside light in a sensing area which overlaps with a sensing area of the optical sensor, and (iii) a cleaning system configured to clean an incident surface of the optical sensor on which light from the sensing area is incident, the vehicle control device comprising:
an extraction unit configured to extract an unmatched pixel group by comparing the reflected light image with the camera image; and
a control unit configured to instruct the vehicle to control according to a water-related substance estimated to correspond to the unmatched pixel group, and the control unit is further configured to instruct the cleaning system of the vehicle in an automated driving mode to perform a cleaning control for the incident surface when adhesion of the water-related substance corresponding to the unmatched pixel group to the incident surface is predicted,
wherein the cleaning system of the vehicle cleans the incident surface,
wherein:
the extraction unit is configured to compare a distance image, which is the reflected light image according to a reflection point distance of the reflected light of the irradiated light, with the camera image; and
the control unit is configured to determine that the adhesion of the water-related substance is predicted when the reflection point distance at the unmatched pixel group is within a reference range, and wherein:
the reference range is set to be equal to or shorter than a threshold value, which is a value associated with the reflection point distance;
when the vehicle is in a stop state, the threshold value defining the reference range is set to a first threshold value;
when the vehicle is in a traveling state, the threshold value defining the reference range is set to a second threshold value; and
the second threshold value is larger than the first threshold value.

2. The vehicle control device according to claim 1, wherein:
an incident surface of the sensing camera on which the light is incident from the sensing area is located between the sensing area and an imaging lens system configured to image the incident light on an imaging element;
a distance from the incident surface of the sensing camera to the imaging lens system is shorter than a focal lens distance of the imaging lens system; and
the control unit is configured to determine that the adhesion of the water-related substance is predicted when the reflection point distance at the unmatched pixel group is within the reference range set based on the focal point.

3. The vehicle control device according to claim 1, wherein:
the control unit is configured to:
instruct the cleaning system to perform the cleaning control to clean the incident surface using a cleaning gas when the reflection point distance is within the reference range; and
instruct the cleaning system to perform the cleaning control to clean the incident surface using a cleaning liquid when the unmatched pixel group whose reflection point distance is within the reference range is extracted from the distance image by the extraction unit after the control unit instructed the cleaning control using the cleaning gas.

4. The vehicle control device according to claim 1, wherein;
the control unit is configured to instruct a driving control of the vehicle in an automated driving mode to exclude the water-related substance estimated to correspond to the unmatched pixel group from an obstacle recognition.

5. The vehicle control device according to claim 1, wherein;
the irradiated light is irradiated by the optical sensor.

6. The vehicle control device according to claim 1, wherein;
the optical sensor comprises a LiDAR sensor.

7. A vehicle control method for controlling a vehicle equipped with (i) an optical sensor configured to acquire a reflected light image by sensing reflected light of irradiated light, (ii) a sensing camera configured to acquire a camera image according to intensity of outside light in a sensing area which overlaps with a sensing area of the optical sensor, and (iii) a cleaning system configured to clean an incident surface of the optical sensor on which light from the sensing area is incident, the vehicle control method comprising:
extracting an unmatched pixel group by comparing the reflected light image with the camera image;
instructing the vehicle to control according to a water-related substance estimated to correspond to the unmatched pixel group; and instructing the cleaning system of the vehicle in an automated driving mode to perform a cleaning control for the incident surface when adhesion of the water-related substance corresponding to the unmatched pixel group to the incident surface is predicted, wherein the cleaning system of the vehicle cleans the incident surface, wherein:

the extracting of the unmatched pixel group includes comparing a distance image, which is the reflected light image according to a reflection point distance of the reflected light of the irradiated light, with the camera image; and the instructing the vehicle includes determining that the adhesion of the water-related substance is predicted when the reflection point distance at the unmatched pixel group is within a reference range, and wherein:

the reference range is set to be equal to or shorter than a threshold value, which is a value associated with the reflection point distance;

when the vehicle is in a stop state, the threshold value defining the reference range is set to a first threshold value;

when the vehicle is in a traveling state, the threshold value defining the reference range is set to a second threshold value; and the second threshold value is larger than the first threshold value.

8. The vehicle control method according to claim 7, wherein:

an incident surface of the sensing camera on which the light is incident from the sensing area is located between the sensing area and an imaging lens system configured to image the incident light on an imaging element;

a distance from the incident surface of the sensing camera to the imaging lens system is shorter than a focal lens distance of the imaging lens system; and the instructing the vehicle includes determining that the adhesion of the water-related substance is predicted when the reflection point distance at the unmatched pixel group is within the reference range set based on the focal point.

9. The vehicle control method according to claim 7, wherein;

the instructing the vehicle includes:

instructing the cleaning system to perform the cleaning control to clean the incident surface using a cleaning gas when the reflection point distance is within the reference range; and instructing the cleaning system to perform the cleaning control to clean the incident surface using a cleaning liquid when the unmatched pixel group whose reflection point distance is within the reference range is extracted from the distance image after instructing the cleaning control using the cleaning gas.

10. The vehicle control method according to claim 7, wherein:

the instructing the vehicle includes instructing a driving control of the vehicle in an automated driving mode to exclude the water-related substance estimated to correspond to the unmatched pixel group from an obstacle recognition.

11. A computer program product configured to control a vehicle equipped with (i) an optical sensor configured to acquire a reflected light image by sensing reflected light of irradiated light, (ii) a sensing camera configured to acquire a camera image according to intensity of outside light in a sensing area which overlaps with a sensing area of the optical sensor, and (iii) a cleaning system configured to clean an incident surface of the optical sensor on which light from the sensing area is incident, the computer program product being stored on at least one non-transitory computer readable medium and comprising instructions configured to, when executed by at least one processor, cause the at least one processor to:

extract an unmatched pixel group by comparing the reflected light image with the camera image;

instruct the vehicle to control according to a water-related substance estimated to correspond to the unmatched pixel group; and instruct the cleaning system of the vehicle in an automated driving mode to perform a cleaning control for the incident surface when adhesion of the water-related substance corresponding to the unmatched pixel group to the incident surface is predicted, wherein the cleaning system of the vehicle cleans the incident surface, wherein the instructions are further configured to cause the at least one processor to:

compare a distance image, which is the reflected light image according to a reflection point distance of the reflected light of the irradiated light, with the camera image; and determine that the adhesion of the water-related substance is predicted when the reflection point distance at the unmatched pixel group is within a reference range, and wherein:

the reference range is set to be equal to or shorter than a threshold value, which is a value associated with the reflection point distance;

when the vehicle is in a stop state, the threshold value defining the reference range is set to a first threshold value;

when the vehicle is in a traveling state, the threshold value defining the reference range is set to a second threshold value; and the second threshold value is larger than the first threshold value.

12. The computer program product according to claim 11, wherein:

an incident surface of the sensing camera on which the light is incident from the sensing area is located between the sensing area and an imaging lens system configured to image the incident light on an imaging element;

a distance from the incident surface of the sensing camera to the imaging lens system is shorter than a focal lens distance of the imaging lens system; and the instructions are further configured to cause the at least one processor to determine that the adhesion of the water-related substance is predicted when the reflection point distance at the unmatched pixel group is within the reference range set based on the focal point.

13. The computer program product according to claim 11, wherein;

the instructions are further configured to cause the at least one processor to:

instruct the cleaning system to perform the cleaning control to clean the incident surface using a cleaning gas when the reflection point distance is within the reference range; and instruct the cleaning system to perform the cleaning control to clean the incident surface using a cleaning liquid when the unmatched pixel group whose reflection point distance is within the reference range is extracted from the distance image after instructing the cleaning control.

14. The computer program product according to claim 11, wherein;

the instructions are further configured to cause the at least one processor to:

instruct a driving control of the vehicle in an automated driving mode to exclude the water-related substance estimated to correspond to the unmatched pixel group from an obstacle recognition.

* * * * *